(12) United States Patent
Oami

(10) Patent No.: US 11,715,227 B2
(45) Date of Patent: Aug. 1, 2023

(54) INFORMATION PROCESSING APPARATUS, CONTROL METHOD, AND PROGRAM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/690,140

(22) Filed: Mar. 9, 2022

(65) Prior Publication Data

US 2022/0198817 A1 Jun. 23, 2022

Related U.S. Application Data

(63) Continuation of application No. 16/650,544, filed as application No. PCT/JP2017/034940 on Sep. 27, 2017, now Pat. No. 11,308,315.

(51) Int. Cl.
| | |
|---|---|
| G06T 7/62 | (2017.01) |
| G06T 7/292 | (2017.01) |
| G06T 7/70 | (2017.01) |
| G01B 11/02 | (2006.01) |
| G01B 11/06 | (2006.01) |
| G06T 7/60 | (2017.01) |
| G06V 40/10 | (2022.01) |
| G06V 40/20 | (2022.01) |

(Continued)

(52) U.S. Cl.
CPC ............. *G06T 7/62* (2017.01); *G01B 11/022* (2013.01); *G01B 11/0608* (2013.01); *G06T 7/292* (2017.01); *G06T 7/60* (2013.01); *G06T 7/70* (2017.01); *G06V 10/462* (2022.01); *G06V 20/52* (2022.01); *G06V 40/10* (2022.01); *G06V 40/103* (2022.01); *G06V 40/20* (2022.01); *G06T 2207/10016* (2013.01); *G06T 2207/30196* (2013.01)

(58) Field of Classification Search
CPC .. G06T 7/62; G06T 7/292; G06T 7/60; G06T 7/70; G06T 2207/10016; G06T 2207/30196; G01B 11/022; G01B 11/0608; G06V 10/462; G06V 20/52; G06V 40/10; G06V 40/103; G06V 40/20
See application file for complete search history.

(56) References Cited

U.S. PATENT DOCUMENTS

2016/0110602 A1* 4/2016 Chujo ................. F24F 11/74
382/103

FOREIGN PATENT DOCUMENTS

| JP | 2001-056853 A | | 2/2001 |
| JP | 2002-197463 | * | 7/2002 |

(Continued)

OTHER PUBLICATIONS

Machine translation for JP 2002-197463 (Year: 2002).*

(Continued)

*Primary Examiner* — Qian Yang
(74) *Attorney, Agent, or Firm* — Sughrue Mion, PLLC

(57) ABSTRACT

An information processing apparatus (2000) includes a detection unit (2020), a state estimation unit (2040), and a height estimation unit (2080). The detection unit (2020) detects a target person from a video frame. The state estimation unit (2040) estimates a state of the detected target person. The height estimation unit (2080) estimates a height of the person on the basis of a height of the target person in the video frame in a case where the estimated state satisfies a predetermined condition.

12 Claims, 13 Drawing Sheets

(51) Int. Cl.
*G06V 10/46* (2022.01)
*G06V 20/52* (2022.01)

(56) References Cited

FOREIGN PATENT DOCUMENTS

| | | |
|---|---|---|
| JP | 2002-197463 A | 7/2002 |
| JP | 2007-078354 A | 3/2007 |
| JP | 2007-078355 A | 3/2007 |
| JP | 2010-237872 * | 10/2010 |
| JP | 2013-037406 A | 2/2013 |

OTHER PUBLICATIONS

Machine translation for JP 2010-237872 (Year: 2010).*
International Search Report for PCT/JP2017/034940 dated Nov. 28, 2017 [PCT/ISA/210].
Machine translation for Japan Patent Application Publication 2007-078354, IDS (Year: 2007).
Machine translation for Japan Patent Application Publication 2013-037405, IDS (Year: 2013).
JP Office Action for JP Application No. 2021-136281, dated Sep. 6, 2022 with English Translation.

* cited by examiner

FIG. 2
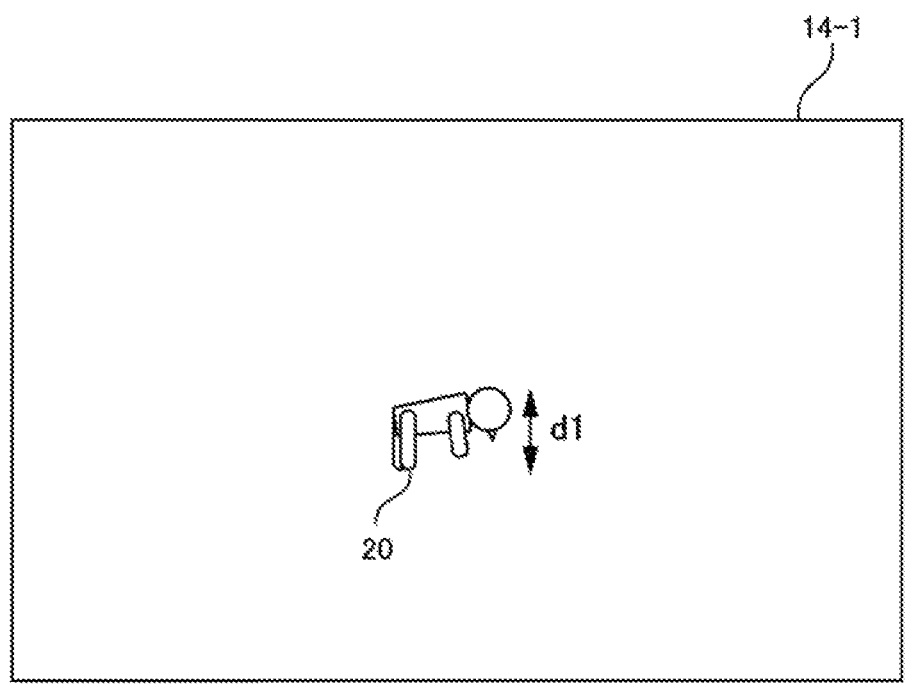
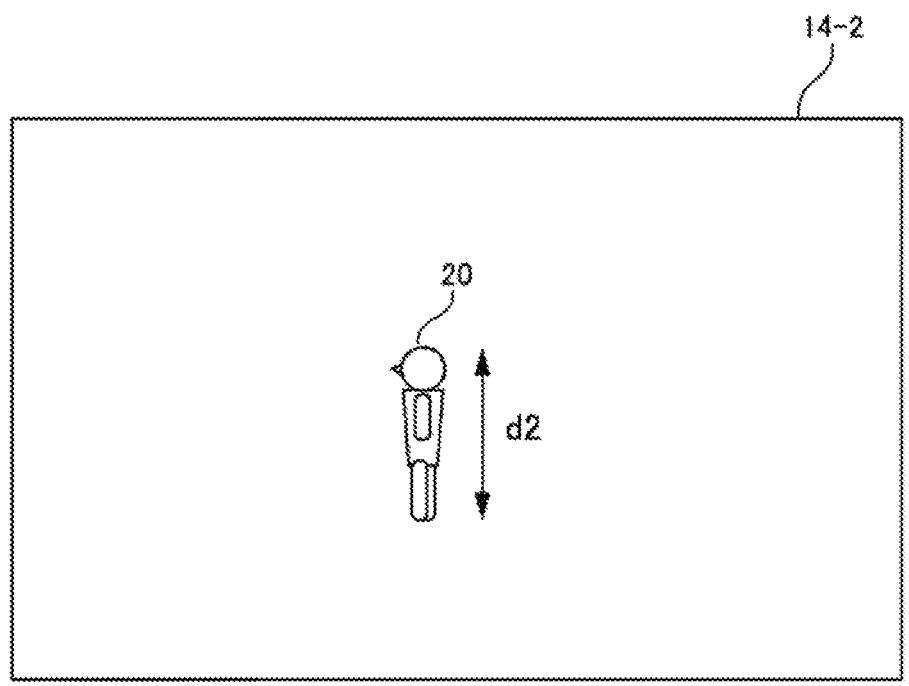

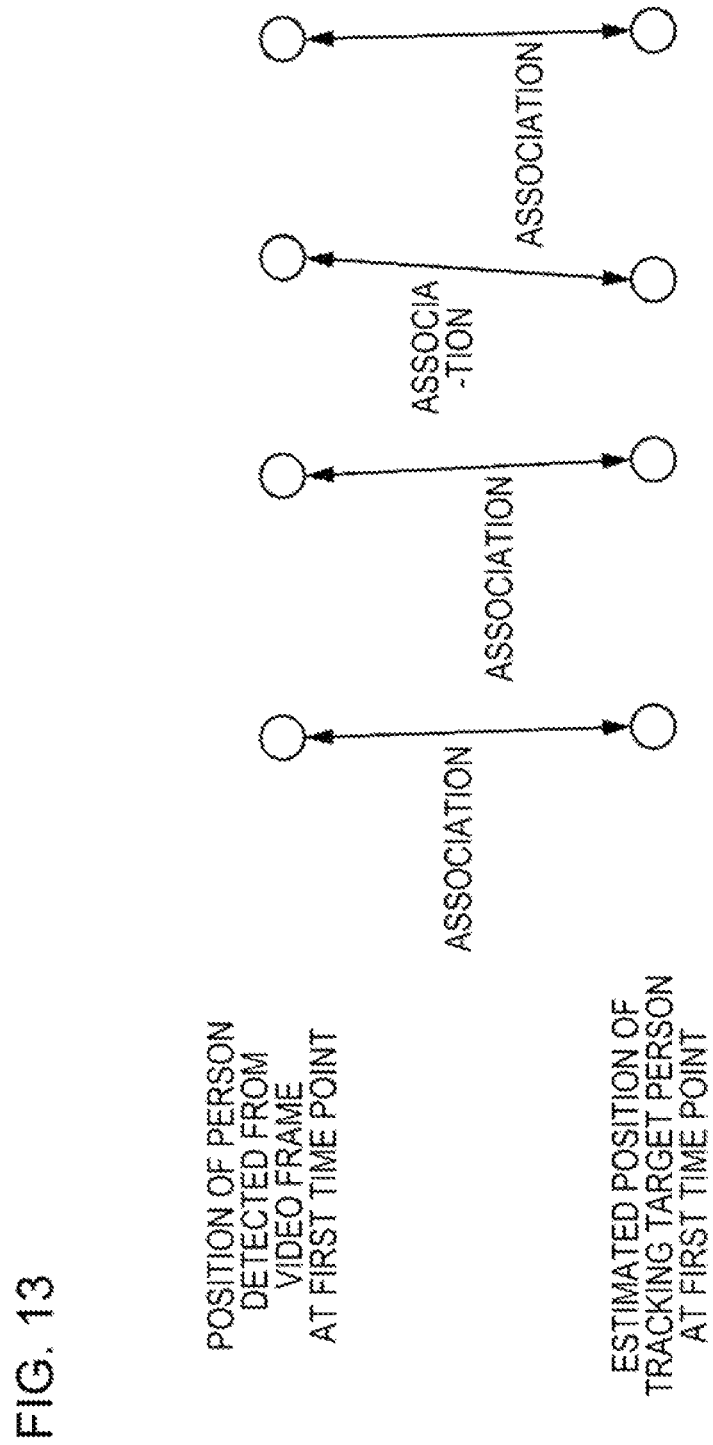

INFORMATION PROCESSING APPARATUS, CONTROL METHOD, AND PROGRAM

CROSS-REFERENCE TO RELATED APPLICATIONS

The present application is a continuation application of U.S. patent application Ser. No. 16/650,544 filed on Mar. 25, 2020, which is a National Stage Entry of international application PCT/JP2017/034940, filed on Sep. 27, 2017, the disclosures of all of which are incorporated in their entirety by reference herein.

TECHNICAL FIELD

The present invention relates to image processing.

BACKGROUND ART

A technology for tracking a person who is included in a video generated by a camera has been developed. Patent Documents 1 and 2 are documents disclosing such a technology. In Patent Document 1, a method of classifying a state of a person into "walking", "upright", "sitting", and "lying" and estimating a foot position in a real space is disclosed. In this method, after the person is detected from an image, the three states "standing", "sitting", and "lying" are distinguished by combining pose determination based on an inclination of a principal axis of a person region with pose determination using a horizontal distance from the camera to a head part and a horizontal distance from the camera to the foot. At this point, the horizontal distance from the camera to the head part is computed by converting coordinates of the head part in an image into coordinates in the real space using an assumed height of the head part and computing a difference between an obtained position and a position of the camera. In the state "standing", computation is performed by assuming that the height of the head part is a body height value. In the states "sitting" and "lying", a predetermined value is used.

In addition, in Patent Document 1, a standstill state or a walking state is determined by comparing positions between frames at a certain time interval. Finally, any of the states "walking", "upright", "sitting", and "lying" is determined by combining the determined state with a pose state described above. Coordinates of the person in the real space are computed using a camera parameter depending on the obtained state. In addition, a trajectory of the person is smoothed by interpolation between states, and trajectory information of the person is computed.

Patent Document 2 discloses a method of specifying an area in which the foot is seen from the camera as a body height identification region, and computing a body height by converting positions of the foot and the head part of the person in the image into coordinates in the real space. The height identification region is defined in a position at which the foot to the head part can be imaged by the camera. When the person enters this region, the position of the foot and the position of the head are computed from the image, and the body height is computed.

RELATED DOCUMENT

Patent Document

[Patent Document 1] Japanese Patent Application Publication No. 2002-197463

[Patent Document 2] Japanese Patent Application Publication No. 2001-056853

SUMMARY OF THE INVENTION

Technical Problem

In Patent Document 1, a method of computing the body height of the person included in the image and a method of computing the height of the head part in the state "sitting" or "lying" are not mentioned. In Patent Document 2, a pose of the person in the body height identification region is not considered. Thus, for example, in a case where the person is bending in the body height identification region, the body height of the person cannot be correctly computed. In addition, since the body height of the person can be estimated only when the person is included in the body height identification region, the body height cannot be estimated in a case where persons overlap with each other in this region in the image or the foot of the person cannot be detected from the image.

The present invention is conceived in view of the above problem. One object of the present invention is to provide a technology for estimating a body height of a person included in an image generated by a camera with high accuracy.

Solution to Problem

An information processing apparatus of the present invention includes 1) a detection unit that detects a person from a video frame, 2) a state estimation unit that estimates a state of a target person using a result of the detection, and 3) a body height estimation unit that estimates a body height of the target person on the basis of a height of the target person in the video frame in a case where the state of the target person satisfies a predetermined condition.

A control method of the present invention is executed by a computer. The control method includes 1) a detection step of detecting a person from a video frame, 2) a state estimation step of estimating a state of a target person using a result of the detection, and 3) a body height estimation step of estimating a body height of the target person on the basis of a height of the target person in the video frame in a case where the state of the target person satisfies a predetermined condition.

A program of the present invention causes a computer to execute each step of the control method of the present invention.

Advantageous Effects of Invention

According to the present invention, a technology for estimating a body height of a person included in an image generated by a camera with high accuracy is provided.

BRIEF DESCRIPTION OF THE DRAWINGS

The above object and other objects, features, and advantages will become more apparent from exemplary example embodiments set forth below and the following drawings appended thereto.

FIG. 2 is a diagram illustrating a video frame in which a target person is included.

FIG. 13 is a diagram illustrating association between a person detected from a video frame at a first time point and a tracking target person.

DESCRIPTION OF EMBODIMENTS

Hereinafter, example embodiments of the present invention will be described using the drawings. It should be noted that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

Example Embodiment 1

<Summary>

Figure 1:
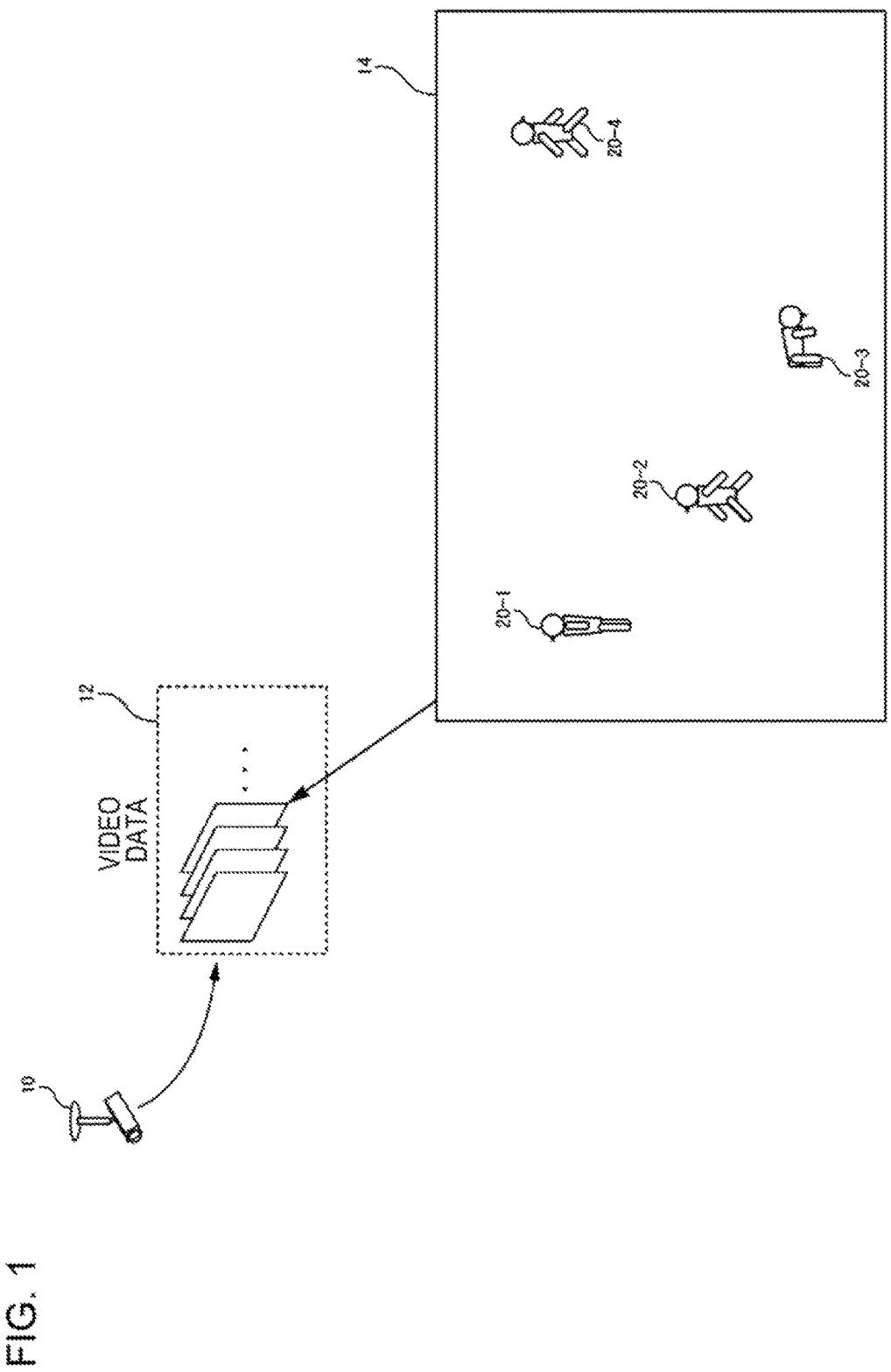
FIG. 1 is a diagram for describing a summary of operation of an information processing apparatus of Example Embodiment 1.

FIG. 1 is a diagram for describing a summary of operation of an information processing apparatus (information processing apparatus 2000 in FIG. 3 described below) of Example Embodiment 1. The operation of the information processing apparatus 2000 in the following description is an illustration for easy understanding of the information processing apparatus 2000. The operation of the information processing apparatus 2000 is not limited to the following example. Details and variations of the operation of the information processing apparatus 2000 will be described below.

The information processing apparatus 2000 detects a person 20 from video data 12 that is generated by a camera 10. In FIG. 1, four persons are detected from a video frame 14. The video frame 14 is one of captured images in time series constituting the video data 12. That is, the video data 12 is configured with a plurality of video frames 14 in time series.

The information processing apparatus 2000 estimates a body height of the person 20 by performing image analysis on the plurality of video frames 14 in which the person 20 is included. A person who is a target for estimating the body height is referred to as a target person. The body height is an invariant quantity that does not change during a certain observation period (for example, from entrance to exiting of a certain customer in a case of trajectory analysis in a store) and is unique to each person. On the other hand, a height of the person observed from the image changes due to a change in pose and the like. Therefore, in contrast with the "body height" which is the invariant quantity, the height of the person observed from the image generated at a certain time point will be used distinctively from the body height by referring to the height of the person as a "temporary-height". Hereinafter, a meaning of performing image analysis on a part of the video frames 14 will be described.

FIG. 2 is a diagram illustrating the video frame 14 in which the target person is included. The person 20 is bending in a video frame 14-1. On the other hand, the person 20 is upright in a video frame 14-2.

The body height of the person 20 is the height of the person 20 in an upright state. Thus, even in a case where image analysis is performed on the video frame 14 such as the video frame 14-1 in which the bending person 20 is included, it is difficult to accurately estimate the body height of the person 20. On the other hand, in a case where image analysis is performed on the video frame 14 such as the video frame 14-2 in which the upright person 20 is included, the body height of the person 20 can be accurately estimated.

Therefore, the information processing apparatus 2000 estimates a state of the target person included in the video frame 14 for each of the plurality of video frames 14 in which the target person is included. Furthermore, the information processing apparatus 2000 estimates the body height of the target person on the basis of the height of the target person in the video frame 14 in which the estimated state of the target person satisfies a predetermined condition among the plurality of video frames 14 in which the target person is included. It is assumed that the predetermined condition is a condition that is satisfied in a case where the state of the target person is an upright pose or a pose close to upright.

For example, in the case in FIG. 2, the body height of the target person is estimated using a height d2 of the target person in the video frame 14-2 instead of a height d1 of the target person in the video frame 14-1. The body height that is estimated will be referred to as an "estimated body height". The estimation of the body height will be referred to as "computation of the estimated body height".

<Advantageous Effect>

As illustrated in FIG. 2, the target person in a state inappropriate for the estimation of the body height may be included in the video frame 14 in which the target person is included. In a case where the body height of the target person is estimated using such a video frame 14, the body height of the target person cannot be accurately estimated.

Therefore, the information processing apparatus 2000 of the present example embodiment estimates the state of the target person included in the video frame 14 and estimates the body height of the target person on the basis of the height of the target person in the video frame 14 in which the target person in a state appropriate for the estimation of the body height is included. By doing so, the body height of the target person can be accurately estimated.

Hereinafter, the information processing apparatus 2000 of the present example embodiment will be described in further detail.

<Example of Functional Configuration of Information Processing Apparatus 2000>

Figure 3:
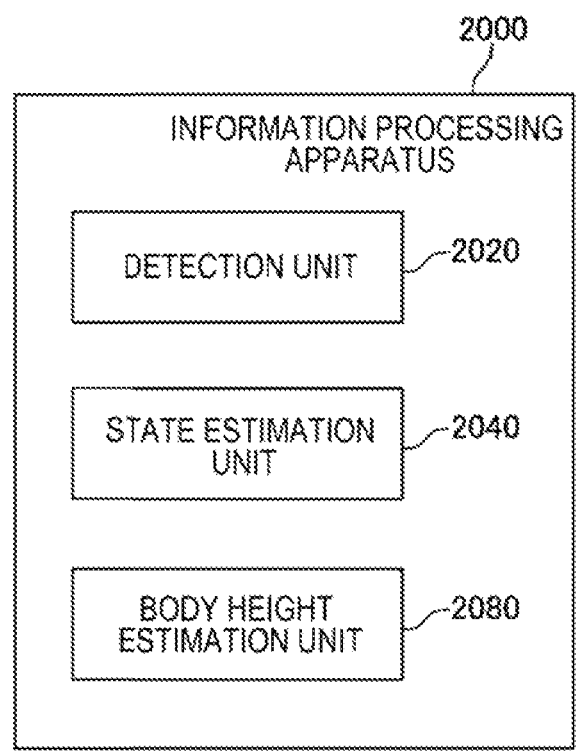
FIG. 3 is a diagram illustrating a configuration of the information processing apparatus of Example Embodiment 1.

FIG. 3 is a diagram illustrating a configuration of the information processing apparatus 2000 of Example Embodiment 1. For example, the information processing apparatus 2000 includes a detection unit 2020, a state estimation unit 2040, and a body height estimation unit 2080. The detection unit 2020 detects the person 20 from the video frame 14. The state estimation unit 2040 estimates the state of the detected person 20. The body height estimation unit 2080 estimates the body height of the person 20 on the basis of the height of the person 20 in the video frame 14 in a case where the estimated state satisfies the predetermined condition.

<Hardware Configuration of Information Processing Apparatus 2000>

Each functional configuration unit of the information processing apparatus 2000 may be implemented by hardware (example: a hardwired electronic circuit) implementing each functional configuration unit, or may be implemented by a combination of hardware and software (example: a combination of an electronic circuit and a program controlling the electronic circuit). Hereinafter, a case where each functional configuration unit of the information processing apparatus 2000 is implemented by a combination of hardware and software will be described.

Figure 4:
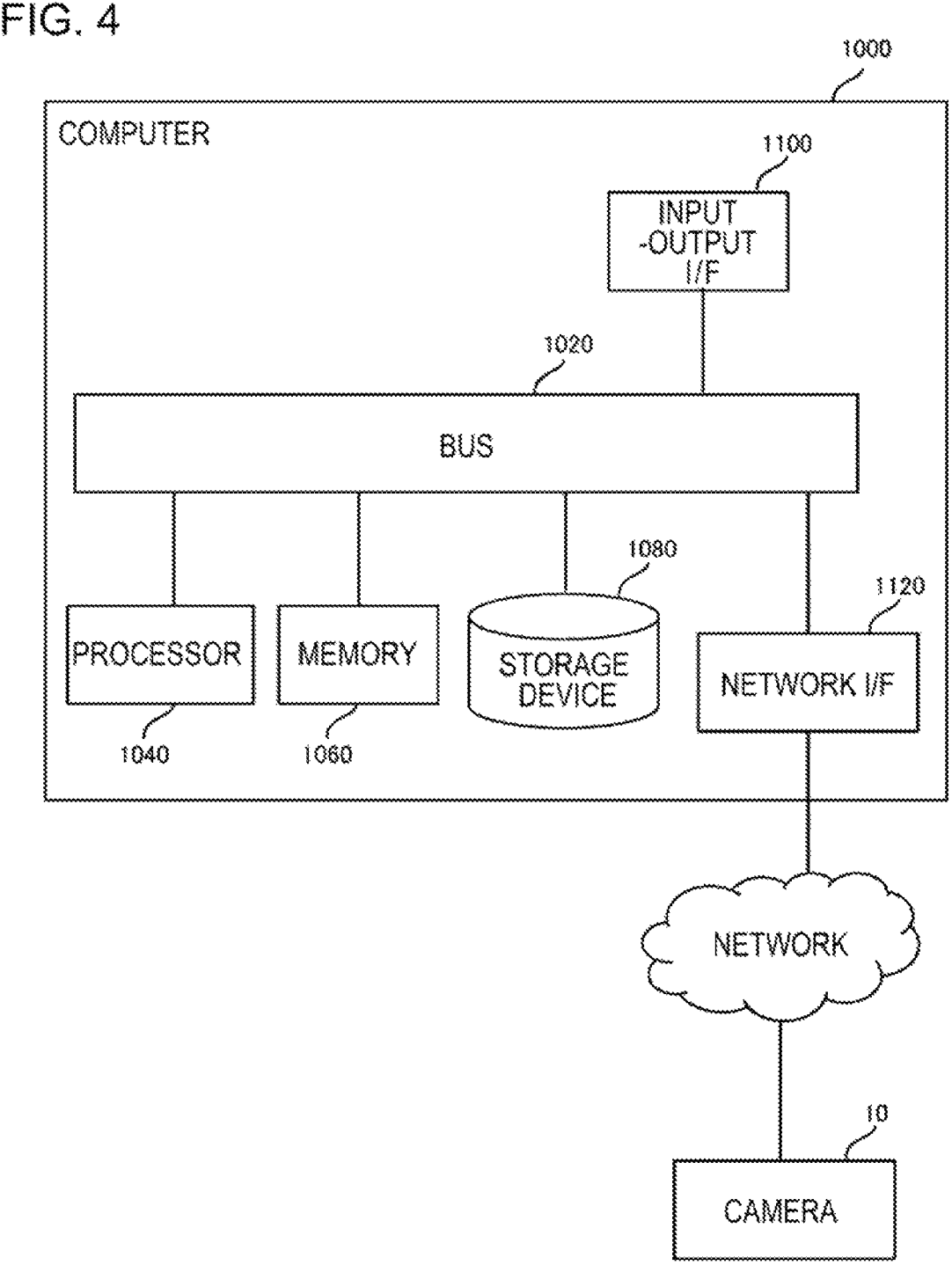
FIG. 4 is a diagram illustrating a computer for implementing the information processing apparatus.

FIG. 4 is a diagram illustrating a computer 1000 for implementing the information processing apparatus 2000. The computer 1000 is any computer. For example, the computer 1000 is a Personal Computer (PC), a server machine, a tablet terminal, or a smartphone. Besides, for example, the computer 1000 may be the camera 10. The computer 1000 may be a dedicated computer designed to implement the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transfer path for transmission and reception of data among the processor 1040, the memory 1060, the storage device 1080, the input-output interface 1100, and the network interface 1120. A method of connecting the processor 1040 and the like to each other is not limited to bus connection. The processor 1040 corresponds to various processors such as a Central Processing Unit (CPU) and a Graphics Processing Unit (GPU). The memory 1060 is a main storage apparatus that is implemented using a Random Access Memory (RAM) or the like. The storage device 1080 is an auxiliary storage apparatus that is implemented using a hard disk, a Solid State Drive (SSD), a memory card, a Read Only Memory (ROM), or the like. The storage device 1080 may be configured by the same hardware as hardware such as the RAM constituting the main storage apparatus.

The input-output interface 1100 is an interface for connecting the computer 1000 to input-output devices. The network interface 1120 is an interface for connecting the computer 1000 to a communication network. For example, the communication network is a Local Area Network (LAN) or a Wide Area Network (WAN). A method of connecting the network interface 1120 to the communication network may be wireless connection or may be wired connection.

For example, the computer 1000 is communicably connected to the camera 10 through the network. A method of communicably connecting the computer 1000 to the camera 10 is not limited to connection through the network. In addition, the computer 1000 may not be communicably connected to the camera 10.

The storage device 1080 stores a program module that implements each functional configuration unit (the detection unit 2020, the state estimation unit 2040, and the height estimation unit 2080) of the information processing apparatus 2000. The processor 1040 implements a function corresponding to each program module by reading each program module into the memory 1060 and executing the program module.

It should be noted that the computer 1000 may be implemented using a plurality of computers. For example, each of the detection unit 2020, the state estimation unit 2040, and the height estimation unit 2080 can be implemented by a different computer. In this case, the program module stored in the storage device of each computer may be only a program module corresponding to the functional configuration unit implemented by the computer.

<Camera 10>

The camera 10 is any camera that generates the video data 12 by generating the video frame 14 in time series by repeatedly performing capturing. For example, the camera 10 is a surveillance camera that is installed for surveillance of a determined facility, road, and the like.

As described above, the computer 1000 implementing the information processing apparatus 2000 may be the camera 10. In this case, the camera 10 performs detection of the person 20, estimation of the state of the target person, and estimation of the body height of the target person by analyzing the video frame 14 generated by the camera 10. As the camera 10 having such a function, for example, a camera called an intelligent camera, a network camera, or an Internet Protocol (IP) camera can be used.

It should be noted that not all functions of the information processing apparatus 2000 may be implemented by the camera 10, and only a part of the functions of the information processing apparatus 2000 may be implemented by the camera 10. For example, only the function of detecting the person 20 from the video frame 14 is implemented by the camera 10, and the other functions of the information processing apparatus 2000 are implemented by a server apparatus. In this case, the server apparatus acquires various information such as the position and an image feature of the detected person 20 from the camera 10. In addition, the server apparatus may acquire only a partial image region in which the person 20 and its surrounding area are included in the video frame 14 generated by the camera 10.

<Flow of Process>

Figure 5:
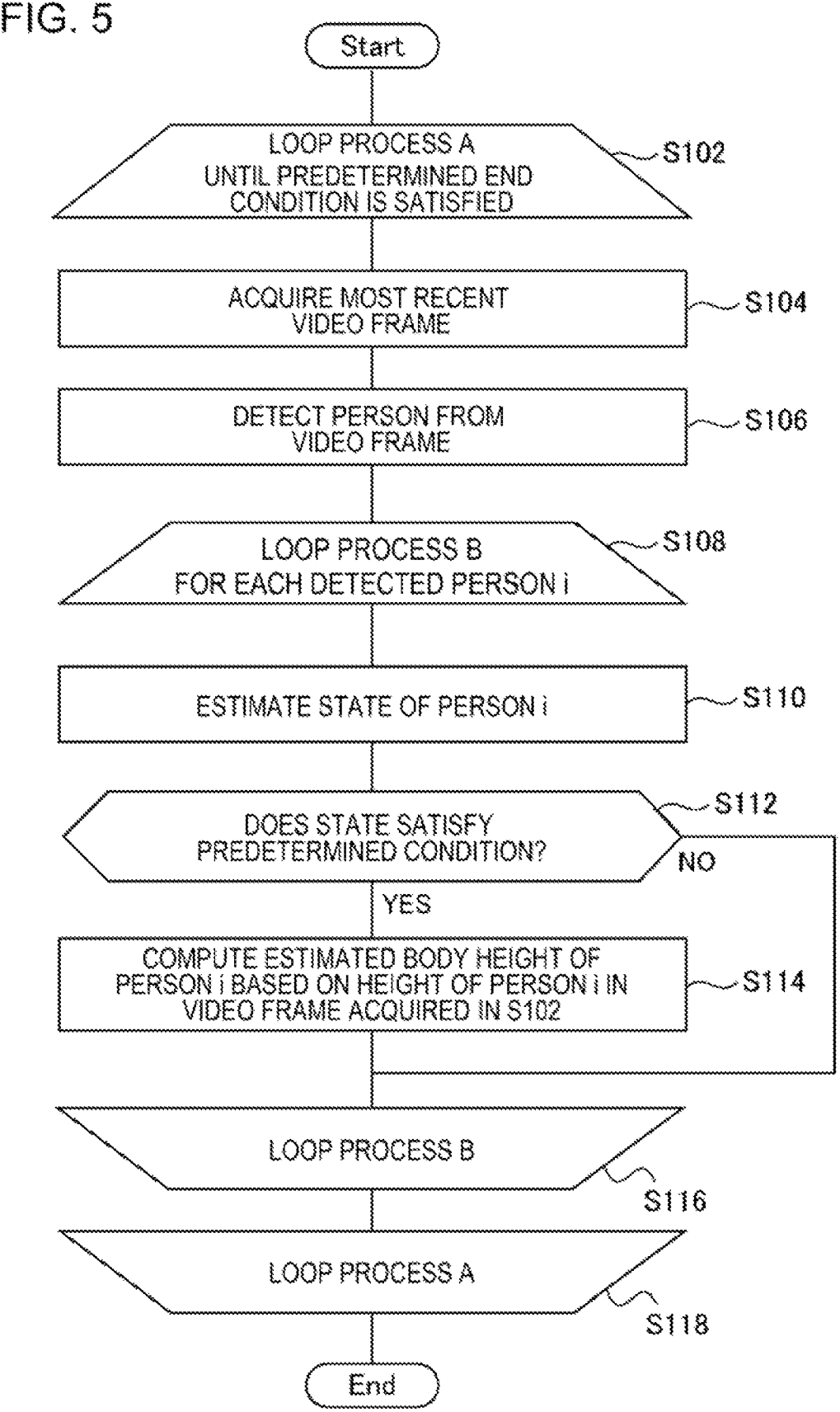
FIG. 5 is a first flowchart illustrating a flow of process executed by the information processing apparatus of Example Embodiment 1.

FIG. 5 is a first flowchart illustrating a flow of process executed by the information processing apparatus 2000 of Example Embodiment 1. A loop process A is a loop process that is repeatedly executed until a predetermined end condition is satisfied. The detection unit 2020 acquires the most recent video frame 14 (S104). The detection unit 2020 detects the person 20 from the acquired video frame 14 (S106). A loop process B is a process that is executed for each detected person 20. The person 20 of a processing target in the loop process B will be referred to as a person i. The person i is the target person.

Figure 6:
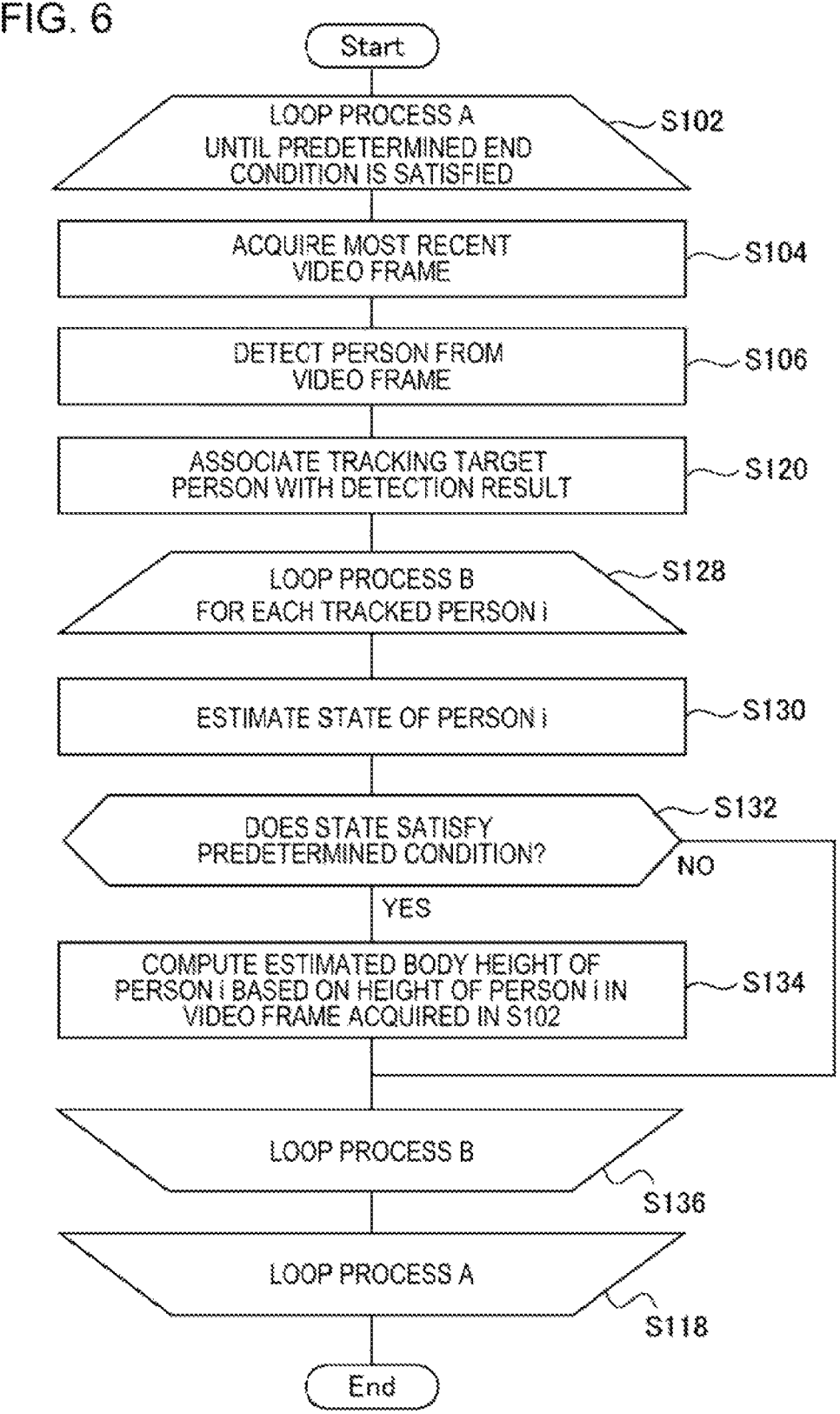
FIG. 6 is a second flowchart illustrating a flow of process executed by the information processing apparatus of Example Embodiment 1.

FIG. 6 is a second flowchart illustrating a flow of process executed by the information processing apparatus 2000 of Example Embodiment 1. In this case, the detection unit 2020 further associates the detected person with a tracking result up to the present, and obtains the tracking result (S120). The loop process B is a process that is executed for each person 20 included in a tracking target obtained by a tracking process. The person 20 of the processing target in the loop process B will also be referred to as the person i.

The state estimation unit 2040 estimates the state of the person i (S110 and S130). The body height estimation unit 2080 determines whether or not the state of the person i satisfies the predetermined condition (S112 and S132). In a case where the state of the person i satisfies the predetermined condition (S112 and S132: YES), the estimated body height of the person i is computed on the basis of the height of the person i obtained from the video frame 14 acquired in S102 (S114 and S134). In a case where the state of the person i does not satisfy the predetermined condition (S112 and S132: NO), the estimated body height of the person i is not computed.

It should be noted that a condition for ending the loop process A is not limited. For example, the loop process A is ended in a case where a predetermined input operation is received from a user.

<Method of Acquiring Video Frame 14: S104>

The information processing apparatus 2000 acquires one or more video frames 14 as a processing target. Various methods of acquiring the video frame 14 by the information processing apparatus 2000 are present. For example, the information processing apparatus 2000 receives the video frame 14 transmitted from the camera 10. Alternatively, for example, the information processing apparatus 2000 accesses the camera 10 and acquires the video frame 14 stored in the camera 10.

It should be noted that the camera 10 may store the video frame 14 in a storage apparatus that is installed outside the camera 10. In this case, the information processing apparatus 2000 acquires the video frame 14 by accessing the storage apparatus. Thus, in this case, the information processing apparatus 2000 and the camera 10 may not be communicably connected.

In a case where a part or all of the functions of the information processing apparatus 2000 are implemented by the camera 10, the information processing apparatus 2000 acquires the video frame 14 generated by the information processing apparatus 2000. In this case, for example, the video frame 14 is stored in a storage apparatus (for example, the storage device 1080) inside the information processing apparatus 2000. Therefore, the information processing apparatus 2000 acquires the video frame 14 from the storage apparatus.

A timing at which the information processing apparatus 2000 acquires the video frame 14 is not limited. For example, each time a new video frame 14 constituting the video data 12 is generated by the camera 10, the information processing apparatus 2000 acquires the newly generated video frame 14. Besides, for example, the information processing apparatus 2000 may periodically acquire a non-acquired video frame 14. For example, in a case where the information processing apparatus 2000 acquires the video frame 14 once in one second, the information processing apparatus 2000 collectively acquires a plurality of video frames 14 (for example, 30 video frames 14 in a case where a frame rate of the video data 12 is 30 frames/second (fps)) that are generated in one second by the camera 10.

The information processing apparatus 2000 may acquire all video frames 14 constituting the video data 12 or may acquire only a part of the video frames 14. In the latter case, for example, the information processing apparatus 2000 acquires the video frames 14 generated by the camera 10 at a ratio of one to a predetermined number.

<Detection of Person 20: S106>

The detection unit 2020 detects the person 20 from the video frame 14 (S102). Various known technologies can be used as a technology for detecting the person 20 from the video frame 14. For example, the detection unit 2020 includes a detector that learns an image feature of the person. The detector detects an image region matching the learned image feature from the video frame 14 as a region (hereinafter, a person region) representing the person 20. For example, a detector that performs detection based on a Histograms of Oriented Gradients (HOG) feature or a detector that uses a Convolutional Neural Network (CNN) can be used as the detector. It should be noted that the detector may be a detector trained to detect the region of the whole person 20 or a detector trained to detect a part of the region of the person 20. For example, in a case where a head part position and a foot position can be detected using the detector that has learned a head part and a foot, the person region can be determined. Besides, for example, it may be configured that the person region is obtained by combining silhouette information (information of a region having a difference with a background model) obtained by background subtraction with detection information on the head part.

The detector outputs information (hereinafter, detection information) related to the detected person 20. For example, the detection information indicates a position and a size of the person 20. The position of the person 20 in the detection information may be represented as a position on the video frame 14 (for example, coordinates using the upper left end of the video frame 14 as an origin) or may be represented as real world coordinates. Existing technologies can be used as a technology for computing the real world coordinates of an object included in an image generated by a camera. For example, the real world coordinates of the person 20 can be computed from the position on the video frame 14 using a camera parameter.

For example, the size of the person 20 is represented by a size (for example, lengths of vertical and horizontal edges or an average value thereof) of a circumscribed rectangle (hereinafter, referred to as a person rectangle) of the person or a circumscribed rectangle of a part of the region of the person such as the head part or the foot. This size may be a size in the video frame 14 or a size in a real world.

<Tracking of Person 20: S120>

It should be noted that in a case of the flow illustrated in FIG. 6, the detection unit 2020 further performs the tracking process on the person. The tracking process is a process of associating the person detected from the video frame input at the current time point with a person who is detected in the frame in the past and is being tracked. For example, a technology that will be described in Example Embodiment 3 described later can be used as a technology for tracking the same person across the plurality of video frames 14. Other existing technologies can also be used.

The information processing apparatus 2000 generates tracking information representing a history of the position and the size of the person 20 by tracking the person 20. A person who is registered in the tracking information, that is, a person who is already detected from the video frame 14 and is set as a tracking target, will be referred to as a tracking target person.

Figure 7:
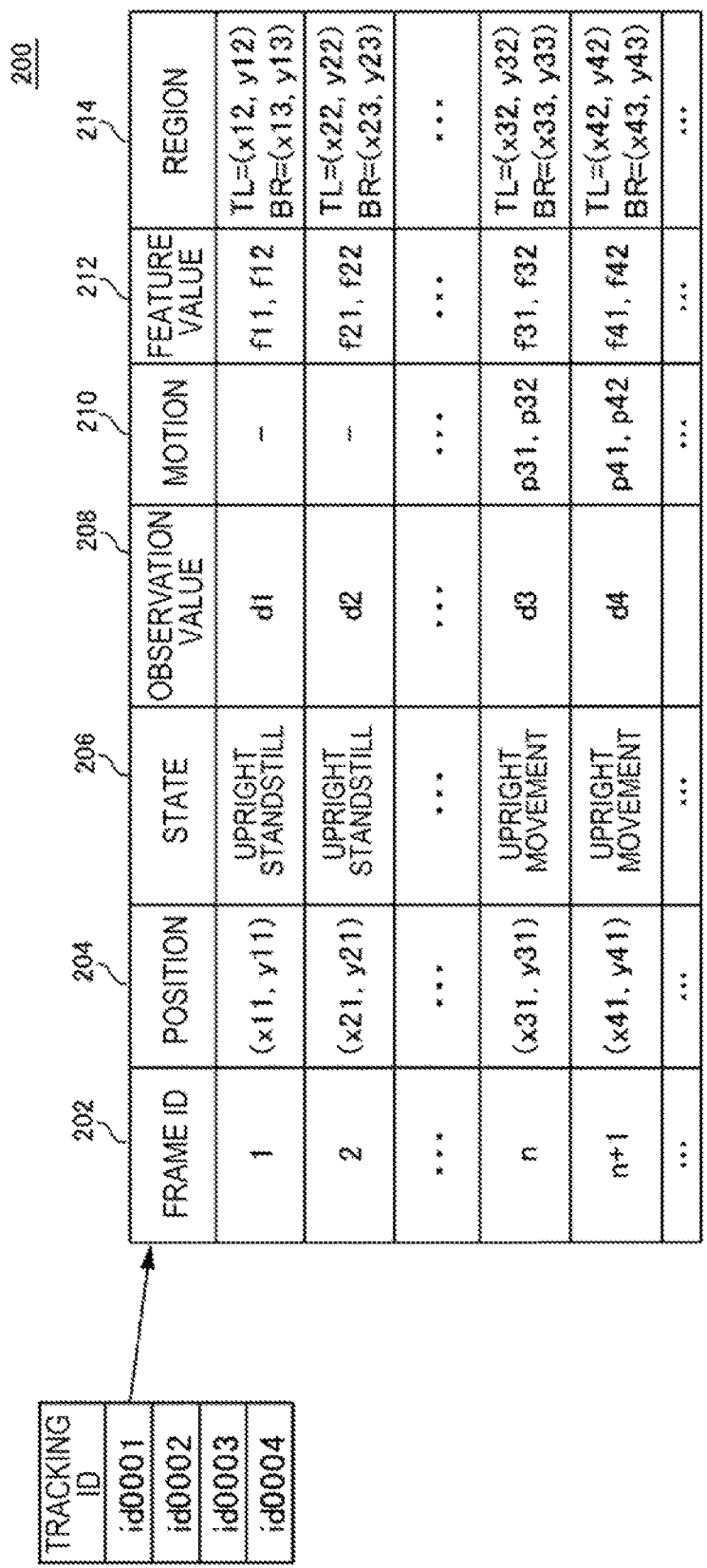
FIG. 7 is a diagram illustrating tracking information.

FIG. 7 is a diagram illustrating the tracking information. In the tracking information in FIG. 7, a table 200 is generated for each tracking target person. The table 200 shows a history of the position and the like of the associated tracking target person. The table 200 shows a frame ID 202, a position 204, a state 206, an observation value 208, a motion 210, a feature value 212, and a region 214. The frame ID 202 is an identifier of the video frame 14. For example, a record in which the frame ID 202 shows n shows the position and the like of the tracking target person in the video frame 14 of which the frame ID is n. It should be noted that the motion 210 shows a parameter of a motion model that is used for predicting movement of the tracking target person in a movement state. The motion model will be described in Example Embodiment 3 described later. In addition, TL and BR in the region 214 represent the coordinates of the upper left end (top left) and the coordinates of the lower right end (bottom right), respectively. The observation value 208 will be described later.

In the case of the flow illustrated in FIG. 6, the detection unit 2020 may also extract information necessary for tracking at a time of detection in S106. That is, the detection information may include a feature value representing an appearance feature of the person 20. A feature value describing the size of the person 20, a color or a pattern of a surface (a color or a pattern of clothes), or the like can be used as the feature value. More specifically, a feature value such as a color histogram, a color layout, an edge histogram, or a Gabor feature can be used. In addition, the detection information may include a feature value representing a shape of an object. For example, a shape descriptor standardized in MPEG-7 can be used as the feature value representing the shape of the object. Besides, for example, a keypoint of the person 20 may be extracted, and a local feature value such as Scale Invariant Feature Transform (SIFT) or Speeded Up Robust Features (SURF) may be extracted for each keypoint. Besides, for example, feature extraction based on a network learned by deep learning may be used.

<Target Person: S108>

The information processing apparatus 2000 sets at least one person 20 detected from the video frame 14 as a target (that is, the target person) of the process of estimating the body height. In a case where a plurality of persons 20 are detected from the video frame 14, a method of deciding which person 20 is to be handled as the target person is not limited. For example, in the process illustrated in the flowchart in FIG. 5, all persons 20 detected from the video frame 14 are handled as the target person.

Besides, for example, the information processing apparatus 2000 may handle only the person 20 included in a predetermined image region in the video frame 14 as the target person. The predetermined image region may be a predetermined region or a region that is dynamically determined. In the latter case, for example, the information processing apparatus 2000 detects a predetermined object from the video frame 14 and handles, as the target person, each person 20 who is detected from the image region having a predetermined size using the object as a reference. The predetermined object may be an object (a chair, a shelf, a door, a statue, or the like) that is placed at all times, or an object such as a left object that dynamically appears. It should be noted that existing technologies can be used as a technology for detecting the object placed at all times or the dynamically appearing object from the image.

<Estimation of State: S110>

The state estimation unit 2040 estimates the state of the target person (S110). The state estimated by the state estimation unit 2040 includes at least information related to a pose of the target person (for example, information indicating any of upright and non-upright). Various methods can be employed as a method of estimating the state of the target person. Hereinafter, several specific examples of the method will be described.

<<Method 1>>

First, a case (a case of the process flow in FIG. 5) where the body height is computed from only one image of the video frames 14 will be described. In this case, for example, the state estimation unit 2040 includes a discriminator (hereinafter, a state discriminator) that discriminates a state by learning, and performs state determination using the discriminator. For example, learning data of an image corresponding to a state (person pose) of each of "upright" and "non-upright" is prepared. The state discriminator is trained to obtain a correct state when the image of the learning data and a detection result of a person are input. In this learning, various discriminators such as a Support Vector Machine (SVM) and a neural network can be used.

More specifically, the state discriminator is trained to distinguish a non-upright state such as crouching or bending from an upright state.

For example, the state estimation unit 2040 inputs the video frame 14 and the person detection result with respect to the input video frame 14 into the state discriminator. The state discriminator outputs information (hereinafter, state information) representing the state of each person 20 detected in the video frame 14. Besides, for example, the state estimation unit 2040 may input only the image region of the target person detected from the video frame 14 into the state discriminator or may input the detection information of the target person into the state discriminator.

The state information may be information for determining the state of the pose of the target person or information indicating a likelihood of the target person being in each state. In the latter case, for each state which the target person may take, the state discriminator computes a likelihood that the target person is in the state. The state discriminator includes the likelihood of each state in the state information.

It should be noted that the state estimation unit 2040 may be configured to determine pose information in which the upright state is further classified in detail as a state. By considering these information, accuracy of the estimation of the height can be increased as will be described later.

For example, in a case of a state of upright and walking, despite of the same upright state, a pose of walking with legs open and a pose in which feet are aligned are considered. Thus, the state discriminator may distinguish both poses by training the state discriminator to distinguish the poses. Furthermore, in a state where legs are open, the determination may be performed by dividing the case into several levels depending on a degree of openness. Such a state discriminator also outputs information representing whether the legs of the target person are closed or open, information representing the degree of openness of the legs, and the like.

In addition, the state information may further include a direction of the person. A determination of the direction can also be performed by learning of the state discriminator in advance.

<<Method 2>>

Next, a case (the case of the flow in FIG. 6) where the tracking process using the plurality of video frames 14 is included will be described. It should be noted that Method 2 is a method of determining the state in the state estimation unit 2040 using person rectangle information in time series included in the tracking information without performing the pose determination based on the image. A case of performing the pose determination based on the image as in Method 1 will be described later as Method 3.

The state estimation unit 2040 estimates the state of the target person in a certain video frame 14 using a tracking result of the target person in the video frame 14 and across the plurality of video frames 14 in the past. It should be noted that existing technologies can be used as a technology for tracking the same person across the plurality of video frames 14. In addition, the information processing apparatus 2000 may use the estimated body height of the person 20 estimated by the body height estimation unit 2080 in tracking of the person 20. A specific method will be described in an example embodiment described later.

In a case where the tracking result can be used, it is possible to distinguish a "movement state" and a "standstill state" besides the "upright state" and the "non-upright state". In this case, for example, a determination of any of three states of a "upright movement state", a "upright standstill state", and a "non-upright standstill state" is performed. It should be noted that while a state referred to as a non-upright movement state may also be included as a selection, it is assumed that the state is not included as a selection in the following description because the state is not usually assumed. Hereinafter, first, distinction between upright and non-upright will be described, and then, distinction between movement and a standstill will be described.

The information processing apparatus 2000 generates the tracking information representing the history of the position and the size of the person 20 by tracking the person 20. The person who is registered in the tracking information, that is, the person who is already detected from the video frame 14 and is set as a tracking target, is referred to as the tracking target person.

While a certain number of histories of the tracking information of the target person are stored (while the number of records of the table 200 of the target person reaches a certain number), the state estimation unit 2040 computes a height of the target person in the real world from each video frame 14. For example, the height of the target person in the real world is obtained by converting the height of the target person in the video frame 14 into a real world value using the camera parameter. It should be noted that for example, the height of the target person in the video frame 14 can be computed as a distance between the foot and the top head part of the target person in the video frame 14. Hereinafter, the height of the target person in the real world computed from the video frame 14 will be referred to as an "observation value". The observation value is the value shown in the observation value 206, described above. That is, the observation value of the target person computed from the video frame 14 is stored in the observation value 206 of the tracking information.

In a case where a certain number of observation values are accumulated for the target person, the state estimation unit 2040 computes a threshold for identifying whether or not the target person is upright using the accumulated observation values. The threshold means a boundary line between a region in which the person 20 is considered to be upright and a region in which the person 20 is considered to be not upright in a distribution of the observation values.

After the threshold is computed, the state estimation unit 2040 estimates the pose of the target person obtained from the video frame 14 using the threshold. For example, in a case where the observation value of the target person is compared with the threshold and is significantly greater than the threshold (for example, in a case where the observation value is greater than or equal to the threshold), the state estimation unit 2040 estimates that the state of the target person is the upright state. On the other hand, in a case where the observation value is not significantly greater than the threshold (for example, in a case where the observation value is less than the threshold), the state estimation unit 2040 estimates that the state of the target person is the non-upright state.

Besides, for example, the state estimation unit 2040 may compute an index value that represents a degree to which the observation value deviates from the threshold, and use the index value as a likelihood of the state of the target person being the upright state.

A method of deciding the threshold will be described. When a certain number of histories are stored, it is considered that the highest value is close to the body height in a case where there is a significant change of the height in the real world. Thus, a value obtained by subtracting a certain value (for example, a value obtained by subtracting 5 cm) from the height as a reference is set as the threshold. It should be noted that the subtracted value is preferably decided by considering error in the observation value. For example, decision can be performed on the basis of a value of a standard deviation of the error. On the other hand, in a case where there is no significant change of the height in the real world (in a case where it is considered that the distribution of the observation values is within a range of the error) when a certain number of histories are stored, a value obtained by subtracting a certain value from a representative value (an average value, a center value, a mode value, or the like) is set as the threshold. In a case where the height in the real world becomes greater than the determined threshold with a significant difference during the setting, it is considered that the original state is not upright. Thus, the threshold is set again using the newly obtained observation value as a reference. The state up to the present is corrected to non-upright and not to upright.

<<Consideration of Movement and Standstill>>

As described above, the state which the target person may take may include the upright movement state, the non-upright movement state, and the upright standstill state. Therefore, it is necessary to determine presence and absence of movement. Hereinafter, a method of determining the presence and the absence of movement and determining any of the upright movement state, the non-upright movement state, and the upright standstill state to which the state of the target person corresponds will be described.

The state estimation unit 2040 determines whether or not the target person is moving using the tracking information. For example, the state estimation unit 2040 compares the position of the target person detected from the video frame 14 with the position of the target person a predetermined time before (for example, in the immediately previous frame) and determines that the target person is at a standstill in a case where a change of the position is small (for example, less than or equal to a predetermined value). On the other hand, in a case where the change of the position is significant, the state estimation unit 2040 determines that the target person is moving. The head part position, a predetermined position (for example, a center or an upper left end) in the person rectangle, the foot position, or the like can be used as the position of the target person. It should be noted that not only the position of the target person in the video frame 14 the predetermined time before but also the position of the target person in a plurality of frames in the past may be compared.

The state estimation unit 2040 may determine whether or not the target person is moving by further considering a direction in which the position of the target person changes. For example, a change of the head part of the target person in a vertical direction means that the target person stands up or sits down, that is, the pose is changing at the same location. Therefore, for example, in a case where the direction in which the position of the target person changes is a direction close to the vertical direction, the state estimation unit 2040 determines that the target person is not moving. On the other hand, in a case where the direction in which the position of the head part of the target person changes is not a direction close to the vertical direction, the state estimation unit 2040 determines that the target person is moving.

For example, whether or not the direction in which the position of the head part of the target person changes is close to the vertical direction can be determined by obtaining an angle between vectors of the direction in which the position of the target person changes and the vertical direction. It should be noted that in a case where the angle between the direction of the change of the position and the vertical direction is significant, the state estimation unit 2040 may determine that the target person is moving.

In addition, in a case where a motion of the head part in the image is close to the vertical direction, the state estimation unit 2040 may determine a change in pose and movement by also considering a change of the foot position. Specifically, in a case where a change of the foot position is small and is regarded as a standstill, it is considered that only the pose is changing and the person is not moving. Thus, the state of the state estimation unit 2040 is set to the non-upright standstill state. On the other hand, in a case where the foot position is moving in conjunction with the motion of the head part, the upright movement state is set.

It should be noted that the foot may be hidden and not seen. Even in this case, in a case where the foot is regarded as not being in conjunction with the head part (for example, in a case where the head part is moving in the vertical direction of the image of the camera 10 but the foot is hidden by an obstacle or the like), it may be determined that the state is the non-upright standstill state by assuming that the foot position is at a standstill. In addition, in a case of a location at which a chair is present and sitting is assumed, it is considered that a likelihood of sitting is high even in a case where the foot position is not seen. Thus, it may be determined that the state is the non-upright standstill state. In addition, in a case where a contradiction occurs in a case where a standstill is assumed (for example, a height of the person rectangle significantly deviates from an assumed height), it may be determined that the state is the upright movement state. In a case where it is difficult to determine any of the states, the likelihoods of both states may be set to be the same, and the state may be estimated (a significant difference is provided between the likelihoods of the states) at a time point at which any of the states becomes clear in any frame in the future.

<<Method 3>>

Next, a case where the tracking process using the plurality of video frames 14 is included (the case of the flow in FIG. 6) and the pose determination based on the image is performed in the state estimation unit 2040 will be described. In this case, the pose of the person can be determined from the image. Thus, upright and non-upright can be directly classified. By combining the pose with the movement information described in Method 2, three states "upright movement", "upright standstill", and "non-upright standstill" can be distinguished.

Furthermore, as described in Method 1, a detailed state may be output. That is, information such as the state of walking with the legs open and furthermore, the degree of openness or the direction of the person may be output together. This discrimination therebetween can be implemented by generating the discriminator based on the image as described in Method 1. By considering these information, accuracy of the estimation of the height can be increased as will be described later.

<Estimation of Body Height: S114>

In the case of the flow in FIG. 5, when the state of the target person estimated using the video frame 14 satisfies a predetermined condition, the body height estimation unit 2080 estimates the body height of the target person on the basis of the height of the target person in the video frame 14 (S114). The predetermined condition is a condition representing that the "state of the target person is the upright state or a state close to the upright state".

For example, it is assumed that the state information is information for determining the state of the target person. In this case, the predetermined condition is a condition that the "state of the target person is the upright state".

Besides, for example, it is assumed that the state estimation unit 2040 computes the likelihood of each of a plurality of states with respect to the target person. In this case, the predetermined condition is a condition that the "likelihood of the state of the target person being the upright state is greater than or equal to a threshold".

In a case where the state of the target person in the video frame 14 satisfies the predetermined condition, the body height estimation unit 2080 computes the observation value of the target person in the video frame 14. As described above, the observation value of the target person in the video frame 14 is a value obtained by converting the height of the target person in the video frame 14 into the height in the real world using the camera parameter or the like. The detection unit 2020 may be configured to compute the observation value of the target person and include the observation value in the detection information regardless of the state of the target person. In this case, the body height estimation unit 2080 acquires the observation value from the detection information.

For example, in a case where the state of the target person in the video frame 14 satisfies the predetermined condition, the body height estimation unit 2080 sets the observation value of the target person in the video frame 14 as the estimated body height of the target person.

Besides, for example, in a case where the state estimation unit 2040 also outputs more detailed state information (for example, the state of walking with the legs open, the degree of openness of the legs, and the direction of the person), these conditions may also be included in the predetermined condition. For example, even in the same upright state, the body height may be estimated only in a case where the legs are not open (alternatively, the degree of openness is small). Alternatively, the body height may be estimated only in a case where the direction of the person is significantly different from an optical axis direction of the camera.

<Estimation of Height: S134>

Even in the case of the flow in FIG. 6, when the state of the target person estimated using the video frame 14 satisfies a predetermined condition, the body height estimation unit 2080 estimates the body height of the target person on the basis of the height of the target person in the video frame 14 (S134). The predetermined condition is a condition representing that the "state of the target person is the upright state or a state close to the upright state". That is, the state is the upright standstill state or the upright movement state. Besides, for example, in a case where the state estimation unit 2040 computes the likelihood of each of the plurality of states with respect to the target person, the predetermined condition is a condition that the "likelihood of the state of the target person being the upright state is greater than or equal to a threshold".

In a case where the state of the target person in the video frame 14 satisfies the predetermined condition, the body height estimation unit 2080 computes the observation value (the height in the real world) of the target person in the video frame 14. The detection unit 2020 may be configured to compute the observation value of the target person and include the observation value in the detection information regardless of the state of the target person. In this case, the body height estimation unit 2080 acquires the observation value from the detection information.

For example, the body height estimation unit 2080 computes the estimated body height of the target person using not only the observation value obtained in the most recent video frame 14 but also the observation value obtained from the video frame 14 (one or plural) in the past in which the state of the target person satisfies the predetermined condition. Specifically, a statistic value of the observation value obtained from the most recent video frame 14 and the observation value obtained from the video frame 14 in the past is computed, and the statistic value is set as the estimated body height of the target person.

For example, in a case where the state of the target person in the most recent video frame 14 satisfies the predetermined condition, the body height estimation unit 2080 computes the estimated body height of the target person using the observation value obtained from the video frame 14 and the observation value obtained from each of a predetermined number of video frames 14 in the part in which the state of the target person satisfies the predetermined condition. By computing the estimated body height of the target person each time the video frame 14 in which the state of the target person satisfies the predetermined condition is obtained, the estimated body height of the target person can be gradually updated to a more accurate value.

Various statistic values can be used. For example, a statistic process is an average value. However, the estimated body height may not be correctly obtained as in a case of erroneous detection. Thus, the statistic value may be computed by a statistic process of excluding an outlier using a method such as robust estimation. For example, a method such as Random Sampling Consensus (RANSAC) can be used.

Besides, for example, the observation values may be weighted and added depending on the likelihood of the state of the target person. For example, in a case where an angle of depression is increased due to the target person positioned close to the camera, it is difficult to estimate the top head part of the target person, and the observation value of the target person is likely to include error. On the other hand, in a case where the target person is distant from the camera, resolution (the size in the video frame 14) of the target person is decreased, and a slight deviation of a detection position affects the estimation of the body height. Thus, depending on the angle of depression from the camera and the distance from the camera, the observation values may be weighted and added by considering an error occurrence likelihood of the observation value, and the average may be computed. Since a tendency of error corresponding to the angle of depression and the distance of the camera can be grasped by capturing a person having a known height in advance by the camera, the error occurrence likelihood can be determined in advance on the basis of a result of the tendency of error. That is, a weight may be decided such that as the error is increased, the weight is decreased, and may be used in weighted averaging.

In addition, weighting in which a type of state of the person is considered may be performed. According to the above state classification, the pose at a time of movement is only upright, and the pose at a time of a standstill includes two poses of upright and non-upright. Thus, in a case of the movement state, there is a high likelihood that the observation value of the target person represents the body height. On the other hand, the height is slightly increased or decreased at the time of movement. Thus, there is a high likelihood that the observation value of the target person includes certain error. In addition, at the time of the standstill, there is a low likelihood that the observation value includes error. Thus, the body height of the target person can be estimated with the highest certainty at a time of the upright standstill state.

Therefore, a high weight is applied to the observation value of the target person obtained from the video frame 14 in which the state of the target person is the upright standstill state. For example, immediately after a transition from the movement state to the standstill state, in a case where a state of the measured observation value is stable and is close to the estimated body height computed at a time of the movement state, it is regarded that a certainty of a standstill in an upright pose is high. Thus, estimation may be performed by increasing the weight of the observation value measured in such a situation. In addition, even in the same movement state, easiness of obtaining also changes depending on a movement velocity. For example, in a case of fast movement, a change in height of the person is increased along with an increase in step length. Thus, in a case where the velocity is high, control may be performed to decrease the weight.

Furthermore, the weighting may be performed by considering the direction of the target person, the degree of openness of the legs, and the like. In a case where the target person is in the upright movement state, a degree to which the observation value of the target person represents the body height varies depending on the direction of movement and the pose of the person at that time. Specifically, in a state where the legs are open, the height is decreased compared to the height in a case where the feet are aligned. Thus, in a case where the legs of the target person are open, the observation value of the target person at that time is likely to be a value smaller than the actual body height. Therefore, the weight applied to the observation value of the target person in a pose in which the feet are aligned is set to be greater than the weight applied to the observation value of the target person in a pose in which the legs are open.

In addition, in a case where the direction of movement is close to the optical axis direction of the camera, the rectangular foot position obtained as the person region is unlikely to be determined, and error is likely to occur in the observation value of the target person. This is more noticeable in a state where the legs are open. Thus, the statistic process is performed by decreasing the weight of the observation value of the target person moving in a direction close to the optical axis direction of the camera.

In addition, an approximate value of the body height may be computed at a time of the upright movement state, and a detailed value may be estimated from the approximate value at a time point of a transition to the standstill state. That is, after the person transitions to the upright standstill state (or before the transition), in a case where the observation value is stable at a value close to the approximate value computed in the upright movement state, there is a high likelihood of computing a correct body height. Thus, the body height may be computed by applying a high weight to the observation value in such a state. For example, the approximate value of the body height is a temporary-height obtained for the target person in the upright movement state.

It should be noted that in order to accurately compute the estimated body height, both of the foot and the head part of the target person are preferably seen in the video frame 14. However, the foot may be hidden due to an overlap with the obstacle or another person. A case where the foot is hidden is desirably excluded in the estimation of the body height. Therefore, a condition that the "foot of the target person is seen" may be added to the predetermined condition. It should be noted that various methods can be used as a method of determining whether or not the foot of the target person is seen. Specifically, the foot may be directly detected, or a determination as to whether or not the foot is hidden by the obstacle or overlaps with a person may be performed. The obstacle such as a shelf is usually present at a predetermined position. Thus, a region in which the foot position is hidden on a floor when seen from the camera can be determined in advance. Thus, a determination as to whether or not the foot of the target person is seen can be performed by determining whether or not the position of the target person is in the region. In addition, the overlap with a person can be determined on the basis of the position of each person 20 detected by the detection unit 2020. For example, in a case where the circumscribed rectangle of another person 20 overlaps with a lower edge of the circumscribed rectangle of the target person, it is determined that the foot of the target person is not seen. At this point, a determination as to whether or not the foot of the target person is seen may be performed using a front-rear relationship between the target person and the other person 20 seen from the camera by considering a three-dimensional position of each person 20. That is, in a case where the circumscribed rectangles of the target person and the other person 20 overlap and the other person 20 is closer to the camera than the target person is, it is determined that the foot of the target person is not seen.

Example Embodiment 2

Figure 8:
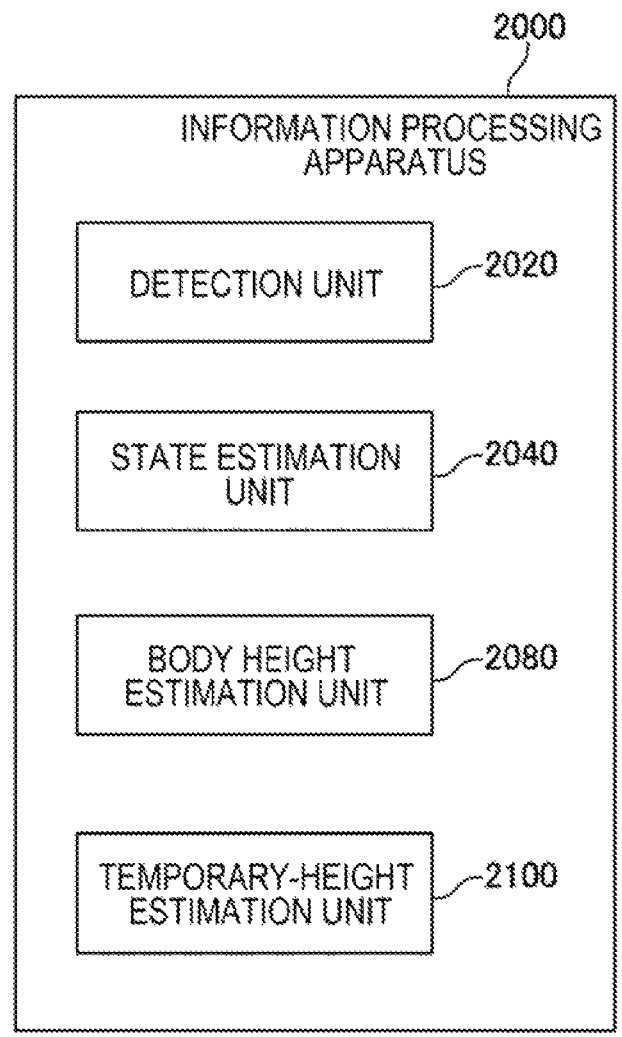
FIG. 8 is a diagram illustrating a functional configuration of an information processing apparatus of Example Embodiment 2.

FIG. 8 is a diagram illustrating a functional configuration of the information processing apparatus 2000 of Example Embodiment 2. The information processing apparatus 2000 of Example Embodiment 2 has the same function as the information processing apparatus 2000 of Example Embodiment 1 except for the matter described below.

The information processing apparatus 2000 of Example Embodiment 2 includes a temporary-height estimation unit 2100. The temporary-height estimation unit 2100 computes the temporary-height of the target person at a certain time point. The temporary-height is a height that is obtained regardless of whether or not the target person is upright. For example, in a case where the target person is crouching, a height from the foot to the top head part of the target person in that state is the temporary-height of the target person at that time. At a time of the upright state, the temporary-height matches the body height in an observation error range.

<Flow of Process>

Figure 9:
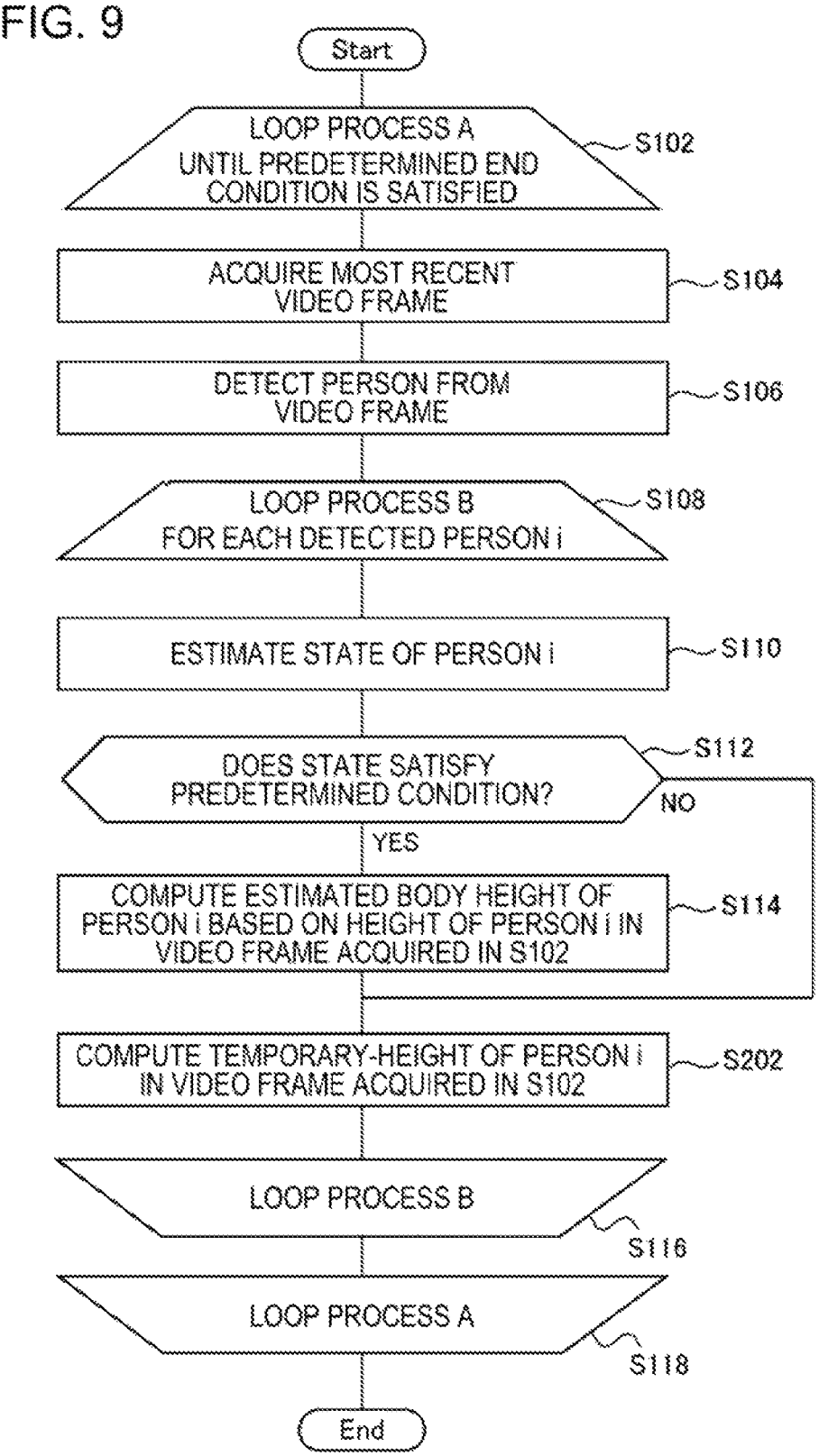
FIG. 9 is a first flowchart illustrating a flow of process executed by the information processing apparatus of Example Embodiment 2.

FIG. 9 is a first flowchart illustrating a flow of process executed by the information processing apparatus 2000 of Example Embodiment 2. The flowchart in FIG. 9 is different from the flowchart in FIG. 5 in that a process (S202) of computing the temporary-height of the target person is executed after the estimation of the body height (S114). Other parts are the same as the flowchart in FIG. 5.

Figure 10:
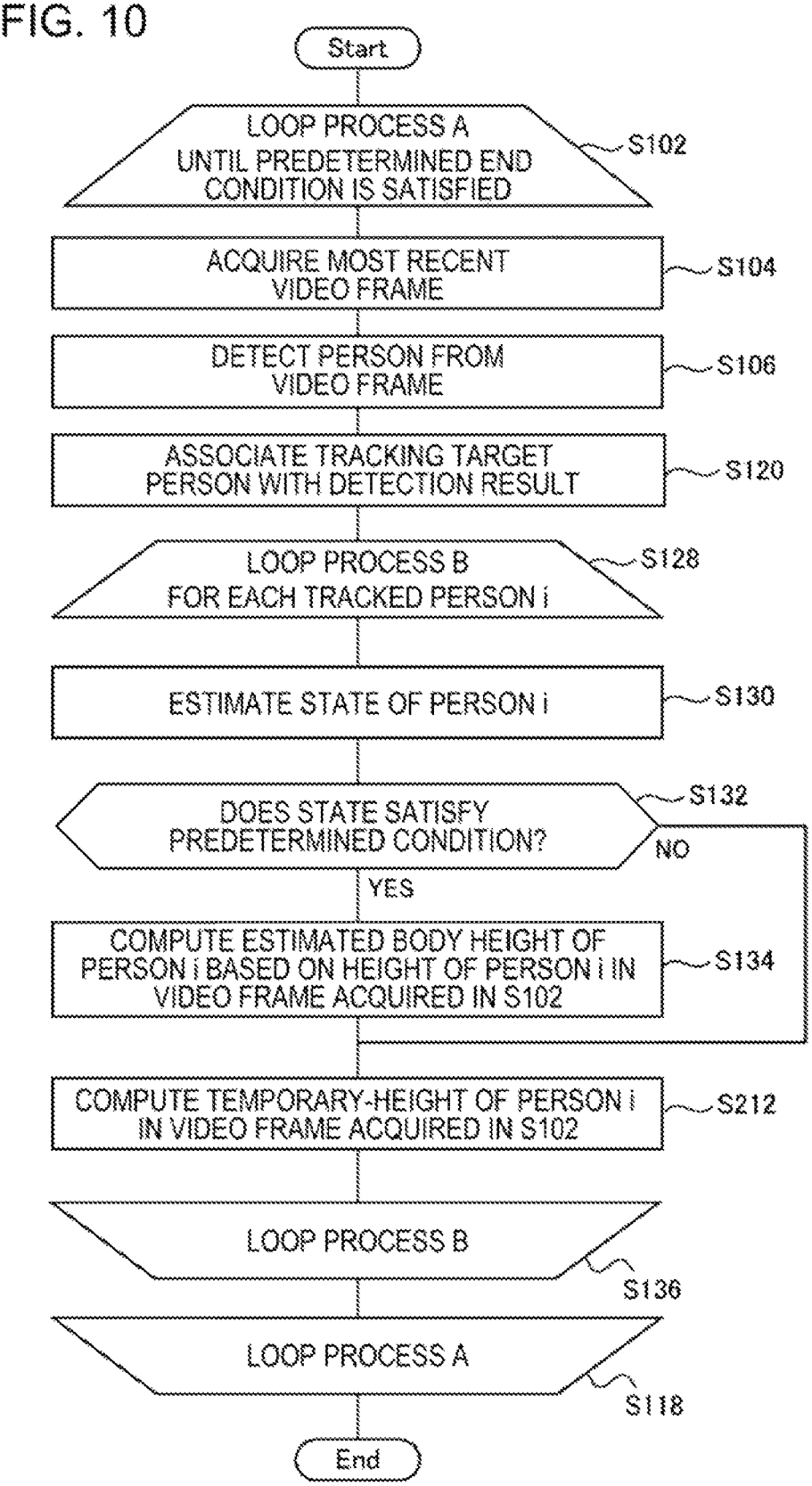
FIG. 10 is a second flowchart illustrating a flow of process executed by the information processing apparatus of Example Embodiment 2.

FIG. 10 is a second flowchart illustrating a flow of process executed by the information processing apparatus 2000 of Example Embodiment 2. The flowchart in FIG. 10 is different from the flowchart in FIG. 6 in that a process (S212) of computing the temporary-height of the target person is executed after the estimation of the body height (S134). Other parts are the same as the flowchart in FIG. 6.

<Estimation of Temporary-Height: S202>

In a case of the flow in FIG. 9, for example, the temporary-height estimation unit 2100 sets the observation value of the target person in all frames including the video frame 14 in which the state of the target person does not satisfy the predetermined condition, to be the temporary-height of the target person at a time point at which the video frame 14 is generated.

<Estimation of Temporary-Height: S212>

In a case where the tracking process is included (in a case of the flow in FIG. 10), for example, the temporary-height estimation unit 2100 may compute the temporary-height of the target person using also information obtained from the plurality of video frames 14 in the past. The temporary-height of the target person has characteristics of a consecutive change in time and characteristics of being less than or equal to the estimated body height. Thus, as in a case where the foot of the target person is not seen due to the obstacle or the like, in a case where it is considered that reliability of the observation value computed from one video frame 14 is low, the temporary-height of the target person is preferably computed by performing complementation (interpolation and extrapolation) in a time direction in consideration of consecutiveness. It should be noted that any existing methods can be used as a method of complementation.

For example, it is assumed that the video frame 14 generated at time point t does not satisfy the predetermined condition for computing the estimated body height and the foot of the target person is not seen in the video frame 14. In this case, for example, the temporary-height estimation unit 2100 computes the temporary-height of the target person at time point t by performing complementation on a change in time of the temporary-height of the target person computed from each of the plurality of video frames 14 in the past before time point t.

It should be noted that one temporary-height of the target person may be computed using a plurality of video frames 14 adjacent in time. For example, the observation values of the target person computed for video frames 14 are averaged in a certain width of a time window. By doing so, the temporary-height of the target person is obtained for each time window. At this point, a weight corresponding to the certainty of the observation value may be applied to the observation value obtained from each video frame 14.

In addition, when the change in pose is small and the observation value of the target person is stable, the width of the time window may be increased. When the height rapidly changes in one direction due to sitting down or standing up, the width of the time window may be decreased.

In a specific state of the person, it is desirable to perform estimation based on constraints described below. In the non-upright standstill state such as crouching, bending, and sitting, it is considered that the position of the person does not change. This tendency is particularly strong in an area in which particularly, a chair or the like is present and sitting is assumed. Thus, in the non-upright standstill state, even in a case where the foot is not seen, the temporary-height may be computed by changing only the top head position without moving the foot position. That is, the foot position is set to a common position among the plurality of video frames 14.

<Example of Hardware Configuration>

For example, a hardware configuration of a computer that implements the information processing apparatus 2000 of Example Embodiment 2 is represented by FIG. 4 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

<Advantageous Effect>

According to the information processing apparatus 2000 of the present example embodiment, the estimated body height of the person 20 and the temporary-height of the person (a height in a case where the person 20 is not upright) are distinctively computed on the basis of the state of the person 20. Thus, the estimated body height of the person 20 can be accurately computed, and the temporary-height of the person 20 at each time can also be accurately computed.

Example Embodiment 3

Figure 11:
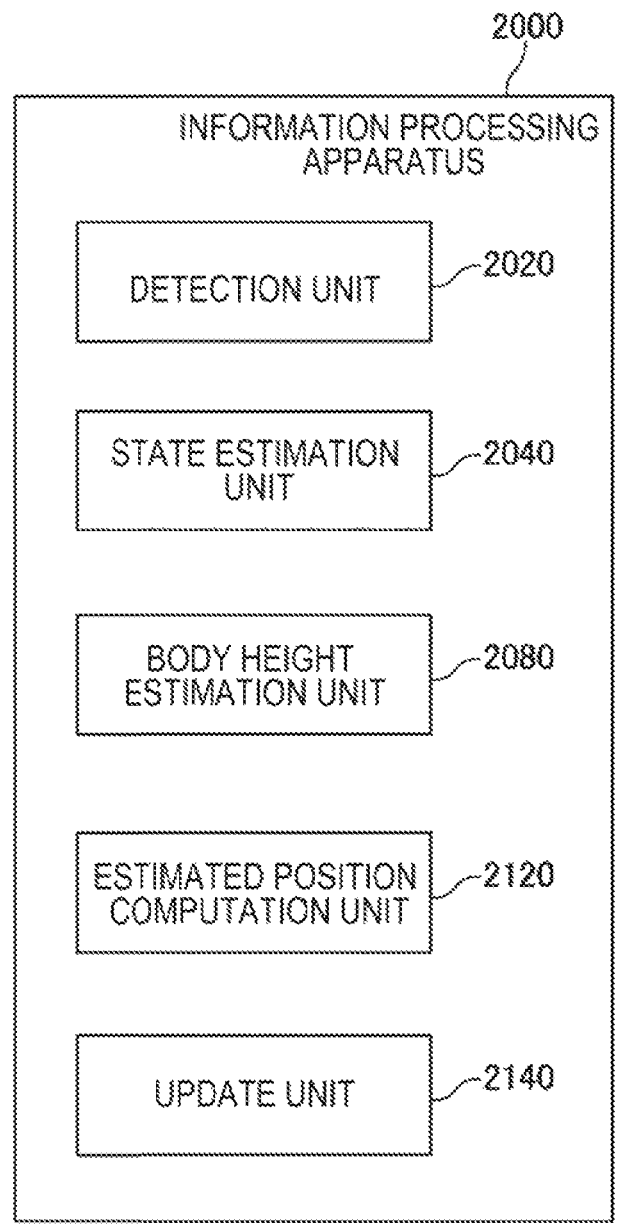
FIG. 11 is a block diagram illustrating a functional configuration of an information processing apparatus of Example Embodiment 3.

FIG. 11 is a block diagram illustrating a functional configuration of the information processing apparatus 2000 of Example Embodiment 3. The information processing apparatus 2000 includes a position estimation unit 2120 and an update unit 2140. The information processing apparatus 2000 of Example Embodiment 3 has the same function as the information processing apparatus 2000 of Example Embodiment 2 except for the matter described below.

The information processing apparatus 2000 of Example Embodiment 3 has a function of tracking the person included in the video data 12. Specifically, the person is tracked by generating and updating the tracking information.

Figure 12:
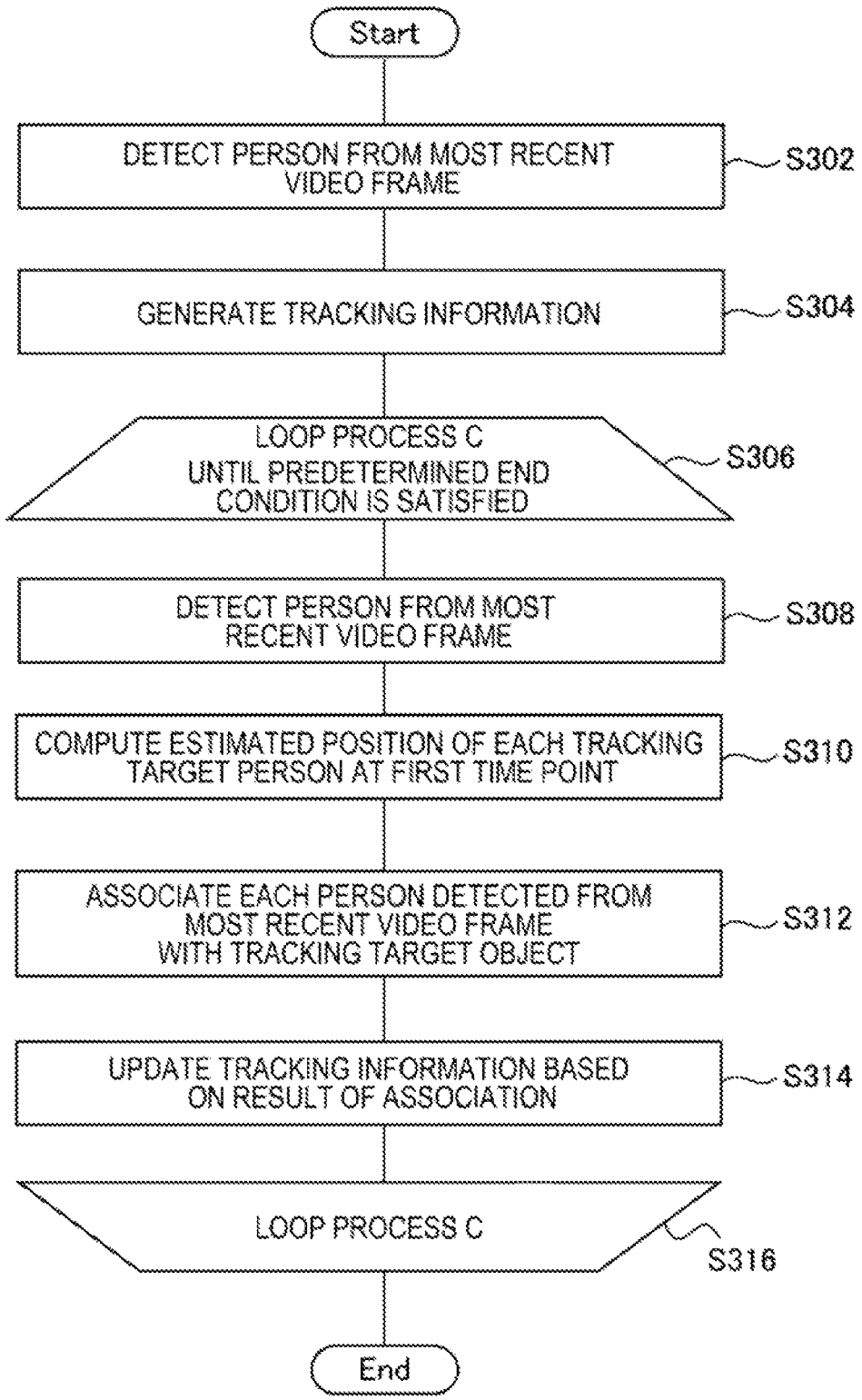
FIG. 12 is a flowchart illustrating a summary of a flow of process executed by the information processing apparatus of Example Embodiment 3.

First, an overall flow of person tracking process will be described using a flowchart. FIG. 12 is a flowchart illustrating a summary of a flow of process executed by the information processing apparatus 2000 of Example Embodiment 3. The information processing apparatus 2000 detects the person 20 from the most recent video frame 14 (S302). The information processing apparatus 2000 generates the tracking information using the detected person 20 as the tracking target person (S304). The tracking target person means the person 20 who is already detected by the information processing apparatus 2000.

A loop process C is a process that is repeatedly executed until a predetermined end condition is satisfied. In S306, in a case where the predetermined end condition is satisfied, the information processing apparatus 2000 ends the process in FIG. 12. On the other hand, in a case where the predetermined end condition is not satisfied, the process in FIG. 12 proceeds to S308.

In S308, the detection unit 2020 detects the person 20 from the most recent video frame 14. A time point at which the acquired video frame 14 is generated will be referred to as a first time point. The position estimation unit 2120 estimates a position of each tracking target person at the first time point using the tracking information (S310). The update unit 2140 associates the person 20 detected from the video frame 14 with the tracking target person (S312). The update unit 2140 updates the tracking information on the basis of a result of association (S314).

It should be noted that a timing at which the information processing apparatus 2000 of Example Embodiment 3 computes the estimated body height or the temporary-height of the target person is not limited. For example, the information processing apparatus 2000 computes the estimated body height or the temporary-height of the target person during the loop process C.

<Computation of Estimated Position: S310>

The position estimation unit 2120 estimates a position of each tracking target person at the first time point using the tracking information (S310). The position of the tracking target person shown in the tracking information is a position in the past (for example, a position in the immediately previous video frame 14). Therefore, the position estimation unit 2120 estimates the position of the tracking target person at the first time point from the position of the tracking target person in the past.

Various methods are present for the estimation. For example, the position estimation unit 2120 predicts the position of the tracking target person at the first time point on the basis of the position of the tracking target person shown in the tracking information and the motion model of the person. As this method, various existing methods such as a method of using a Kalman filter and a method of using a particle filter can be used. It should be noted that predicted positional information may be coordinates in the image or real world coordinates. In a case of the coordinates in the image, a prediction result may be generated as the person rectangle information.

The motion model of the person may vary for each tracking target person. For example, the position estimation unit 2120 decides the motion model of the tracking target person using a state that is estimated in the past for the tracking target person. For example, a prediction model corresponding to each of the upright movement state, the upright standstill state, and the non-upright standstill state is prepared in advance. The position estimation unit 2120 computes an estimated position of the tracking target person using the prediction model corresponding to the most recent state of the tracking target person (the state of the tracking target person shown in the most recent tracking information).

For example, in the upright movement state, a model that predicts a motion based on the history of the position of the tracking target person shown in the tracking information is used. As a specific example, the following uniform linear motion model can be used. First, the uniform linear motion model computes a velocity vector of the tracking target person using the tracking information in a predetermined period in the past and computes a motion vector of the tracking target person depending on the velocity vector and a frame time interval. The uniform linear motion model computes the estimated position of the tracking target person at the first time point by adding the motion vector to the position of the tracking target person shown in the most recent tracking information.

In the upright standstill state, it can be predicted that the tracking target person does not move. Thus, a model having a movement amount of 0 is used. That is, the position of the tracking target person at the first time point is the same as the position shown in the most recent tracking information.

In the non-upright standstill state, movement caused by walking does not occur, but a change in pose may occur. For example, while the foot position does not move, the head part position may move in a direction close to verticality. Therefore, in the non-upright standstill state, a model that predicts such a change in pose is used.

The position estimation unit 2120 may estimate the position by considering the state of the tracking target person only in a state having the highest certainty (most likely state) or in each of a plurality of states. In the latter case, the estimated position corresponding to each of the plurality of states is computed.

<Association Between Person 20 and Tracking Target Person: S312>

The update unit 2140 associates the person 20 detected from the video frame 14 at the first time point with the tracking target person. This association is a process of determining the tracking target person to which each person 20 detected from the video frame 14 at the first time point corresponds. FIG. 13 is a diagram illustrating association between the person 20 detected from the video frame 14 at the first time point and the tracking target person. In FIG. 13, the person 20 and the tracking target person who are connected to each other by a bidirectional arrow are the person 20 and the tracking target person who are associated with each other.

Various methods are present for the association. For example, on the basis of closeness between the predicted position of the tracking target person and the position of the detected person 20, similarity between appearance feature values of the both, and the like, the body height estimation unit 2080 can compute a likelihood (hereinafter, referred to as an association likelihood) representing a possibility of association between the both and perform the association. For example, the likelihood can be converted into a cost, and the association problem between the tracking target person and the detected person can be reduced to a minimum cost problem and be solved using an algorithm such as a Hungarian method.

In a case where the association likelihood is obtained, for example, closeness information of the person is determined by a distance in the real space. That is, positions in the video frame 14 are converted into position coordinates in the real space using the camera parameter and height information of the persons, and a distance between the coordinates is obtained.

At this point, the update unit 2140 decides the height of the person to be used in the conversion, depending on the state of the person. As described above, the information processing apparatus 2000 distinctively computes the estimated body height and the temporary-height of the target person. In addition, the temporary-height of the target person at each time point is stored in the tracking information.

Therefore, the update unit 2140 computes the position using any of the estimated body height and the temporary-height of the person 20 depending on the state of the person 20 at the first time point. Specifically, in the upright standstill state or the upright movement state, either the person 20 is at a standstill or is moving in a upright state. Thus, the height of the person 20 may be regarded as being equal to the body height. Thus, the update unit 2140 regards the height of the top head position of the person 20 detected from the video frame 14 as the body height and converts the coordinates of the person 20 in the video frame 14 into real world coordinates using the camera parameter. On the other hand, in a case of the non-upright standstill state, the height of the person 20 is different from the height and thus, is computed using the temporary-height of the person 20 at the first time point.

It should be noted that as described above, in a case where a motion of the head part of the person 20 is also predicted in the case of the non-upright standstill state in the position estimation unit 2120, the position of the person 20 may be computed by reflecting a change of the temporary-height of the person 20 caused by the motion. That is, without using the temporary-height of the person 20 included in the tracking information in the past as it is, the positional information may be estimated by reflecting the change caused by the motion of the head part on the temporary-height of the person 20.

In addition, the closeness information of the person may be computed as coordinates in the image. For example, coordinates of a specific position (for example, the foot position) of the person rectangle in the image may be obtained, and the closeness may be determined by the distance between the coordinates. Alternatively, the closeness may be determined by an overlap between the person rectangles. In this case, it is determined that as the overlap between the rectangles is increased, the persons are closer to each other.

It should be noted that the estimated position of the tracking target person is assumed to be obtained in only the most likely state. In this case, the update unit 2140 may obtain the association likelihood between the position of each tracking target person in the most likely state and the position of the person 20 detected from the video frame 14 at the first time point. On the other hand, in a case where the estimated position of the tracking target person is obtained for the plurality of states, the association likelihood is computed for each of the states, and the state having the highest association likelihood and the association likelihood at that time are selected.

In addition, the similarity between the appearance feature values may be considered together. In this case, a determination is performed using a distance between the feature values or a scale representing the similarity. As the scale, various existing scales such as a Euclidean distance and a histogram intersection can be used.

<Update of Tracking Information>

The update unit 2140 updates information of the tracking target person shown in the tracking information on the basis of the result of association. Specifically, information related to each tracking target person at the first time point is added to the tracking information.

For example, the update unit 2140 updates the positional information of the tracking target person. For example, the update unit 2140 sets the position of the tracking target person at the first time point as the position of the person 20 associated with the tracking target person. Besides, for example, the update unit 2140 may set the positional information of the tracking target person at the first time point as a position obtained by weighting and adding the estimated position of the tracking target person at the first time point and the position of the person 20 associated with the tracking target person.

Regarding motion information of the tracking target person, a parameter of the motion model is updated on the basis of a difference between the updated positional information and prediction information of the motion. For example, in a case of a person who can be assumed to have a uniform linear motion, it is considered that an update is performed by adding the difference between the estimated position and the updated position to the current motion. Alternatively, in a case where tracking is performed using the Kalman filter, the positional information and the motion information may be updated on the basis of a known update formula of the Kalman filter.

Regarding an update of region information, the rectangle may be computed again on the basis of the updated positional information in a case where the region information is the circumscribed rectangle of the person. At this point, the rectangle information may be updated by considering not only movement of the position but also a change of size in appearance and the like using calibration information of the camera.

The corresponding tracking target person may not be present for the person 20 detected from the video frame 14. For this person 20, a determination as to whether or not the person 20 is a newly appearing person (enters a capturing range of the camera 10) is performed. In a case where it is determined that the person 20 is a newly appearing person, the person 20 is added to the tracking information as a new tracking target person. On the other hand, in a case where the person 20 is not a newly appearing person, the person 20 is not added to the tracking information. For example, in a case where the region of the person 20 significantly overlaps with the region of the existing tracking target person, it is determined that there is a high possibility of erroneous detection, and new addition is not performed.

On the other hand, the corresponding person 20 may not be present for the tracking target person. For this tracking target person, a determination as to whether or not the tracking target person is a person out of the capturing range of the camera 10 is performed. In a case where it is determined that the tracking target person is a person out of the capturing range, the person is excluded from the tracking information. For example, in a case where the tracking target person moving toward the outside of the capturing range around an edge of the capturing range of the camera 10 at a time of a previous update or the tracking target person present near an exit at a time of the previous update is not associated with any person 20, the tracking target person is a person out of the capturing range of the camera 10. Instead of excluding the person from the tracking information, information that indicates that the person out of the capturing range of the camera 10 may be added to the tracking information (for example, a bit of an exclusion flag is set to 1).

<Example of Hardware Configuration>

For example, a hardware configuration of a computer that implements the information processing apparatus 2000 of Example Embodiment 3 is represented by FIG. 4 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

<Advantageous Effect>

According to the information processing apparatus 2000 of the present example embodiment, in the computation of the estimated position of the tracking target person and the association between the tracking target person and the person 20 detected from the video frame 14, the state of the person is considered, and any of the estimated body height and the temporary-height of the person that is more appropriate is used. By doing so, the person can be tracked with higher accuracy.

By tracking the person with higher accuracy, the position of the person at each time can be estimated with high accuracy. Accordingly, the trajectory analysis can be performed with higher accuracy than the trajectory analysis in the related art. For example, in the store, a trajectory of a customer can be analyzed and used for marketing, or a motion of staff can be visualized and used for a purpose of measuring work efficiency. In addition, in a warehouse or a factory, how a worker is moving can be visualized and used for reviewing improvement in workflow and work efficiency.

Example Embodiment 4

For example, the information processing apparatus 2000 of Example Embodiment 4 is shown in FIG. 11 in the same manner as the information processing apparatus 2000 of Example Embodiment 3. The information processing apparatus 2000 of Example Embodiment 4 has the same function as the information processing apparatus 2000 of Example Embodiment 3 except for the matter described below.

In the information processing apparatus 2000 of Example Embodiment 4, it is assumed that the video data 12 is obtained from a plurality of cameras 10. Thus, the following feature is included.

<Generation of Detection Information>

The detection unit 2020 generates the detection information such that the camera 10 that captures each detected person 20 can be determined. Specifically, an identifier (camera identifier) that indicates the camera 10 by which information detected from the video frame 14 is generated is set in the detection information. For example, the detection unit 2020 generates individual detection information for each of the plurality of cameras 10 and associates the camera identifier with each detection information. Besides, for example, the detection unit 2020 may generate one detection information that shows all persons 20 detected from the plurality of cameras 10, and indicate the camera 10 from which the person is detected in each record.

<Update of Tracking Information>

In a case where the video frame 14 is obtained from each of the plurality of cameras 10, the detected person 20 varies for each video frame 14. However, in a case where the capturing ranges of the cameras 10 partially overlap, the same person 20 may be detected from the plurality of video frames 14.

Considering that the detected person 20 varies for each video frame 14, the information processing apparatus 2000 narrows down the tracking target persons of an update target to a part of the tracking target persons included in the tracking information when the tracking information is updated using the video frame 14 obtained from a certain camera 10. For example, it is assumed that the information processing apparatus 2000 updates the tracking information using the video frame 14 generated by a first camera. In this case, the position estimation unit 2120 computes the estimated position for only the tracking target person having a high likelihood of being present in the capturing range of the first camera as a target among the tracking target persons shown in the tracking information. For example, the position estimation unit 2120 obtains, in advance, a region that can be captured from the first camera in the real space, and extracts the tracking target person who is estimated to be included in the capturing range of the first camera by determining whether or not each tracking target person is included in the region from the positional information. The position estimation unit 2120 computes the estimated position for only the extracted tracking target person.

In addition, the update unit 2140 performs the association with the person 20 detected from the video frame 14 and the update of the tracking information for only the extracted tracking target person. At this point, for a person who is not included in the capturing range of the first camera among the tracking target persons, information that represents that the tracking information is not updated because the person is not included in the capturing range of the first camera may be included in the tracking information, and the person may be used in a subsequent stage of the process.

<Estimation of State>

In a case where the plurality of cameras 10 are present, easiness of state determination of the person may vary depending on the camera. The state estimation unit 2040 of Example Embodiment 4 estimates the state of the person by considering this point. For example, in a case where the person is closer to the camera, the size (resolution) of the person region in the video frame 14 is increased, and the motion and the like of the person are easily determined. In addition, in a case where the motion of the person is determined, a motion in a direction perpendicular to an optical axis is more easily determined than a motion in the optical axis direction of the camera. Accordingly, the easiness and certainty of state determination of the person change depending on a positional relationship between the camera and the person, and the like.

Therefore, the state estimation unit 2040 estimates the state of each person 20 using the video frame 14 obtained from each of the plurality of cameras 10 and uses a state having the highest reliability among the states. For example, for each video frame 14, the state estimation unit 2040 computes reliability of state estimation on the basis of a distance between the camera generating the video frame 14 and the detected person 20 (a shorter distance means higher reliability) or a relationship of an angle between the motion of the person 20 and the optical axis of the camera 10 (an angle closer to perpendicularity means higher reliability). The state of the person 20 that is estimated using the video frame 14 having the highest reliability is used as the state of the person 20.

In addition, for each video frame 14, a determination as to whether or not the target person is hidden by another person or the obstacle may be performed and be reflected on a priority of the camera for performing state determination. That is, the state of the target person is estimated by preferentially using the video frame 14 in which the target person is not hidden by another person or the obstacle.

<Correction of Estimated Body Height and Temporary-Height>

In a case where the target person is captured by the plurality of cameras 10, the body height estimation unit 2080 increases accuracy of the estimated body height using the video frame 14 generated by each of the plurality of cameras 10 at the same time (that is, using a plurality of video frames 14 generated by different cameras 10). In a case where the estimated body height of the person is different from the actual body height and the position of the person in the real space is estimated using the estimated body height, the position of the person is projected to a position that deviates in a depth direction of the camera. For example, in a case where the estimated body height is less than the actual body height and the coordinates in the image are converted into the coordinates in the real space using the camera parameter, the converted coordinates are farther from the camera than the actual position is. Conversely, in a case where the estimated body height is greater, the converted coordinates are closer than the actual position is. Thus, in a case where there is a deviation between the estimated body height and the actual body height, even the same person is projected to a different position for each camera in a case where the position is obtained for each of the plurality of cameras at the same time. In other words, in a case where the position deviates, the estimated body height can be approximated to a correct value by correcting the estimated body height to match the positions.

Specifically, if the difference between the positions in the real space obtained as to the cameras decreases in a case where a certain value is added to the estimated body height comparing to a case of the original estimated body height, the estimated body height is increased. Conversely, if the difference between the positions in the real space obtained as to the cameras decreases in a case where a certain value is subtracted from the estimated body height comparing to a case of the original estimated body height, the estimated body height is decreased. Consequently, in a case where the positions are sufficiently close among the cameras, it is considered that the estimated body height at that time is close to the true value. Thus, the obtained value is set as the estimated body height. In a case where the accuracy of the estimated body height at each time point is increased, the accuracy of the estimated body height that is finally computed as the statistic value of the estimated body height at each time point is also increased.

It should be noted that the temporary-height of the person can also be corrected using the same method.

Erroneous detection or non-detection may also be included in a result of person detection. Thus, a method of gradually changing and setting the estimated body height and the temporary-height along with an elapse of time without significantly changing the estimated body height and the temporary-height at once is also considered. In this case, since the estimated body height and the temporary-height gradually change, smooth trajectory information can be obtained. In addition, high accuracy position estimation can be performed without being significantly affected by a sudden erroneous detection result.

It should be noted that in a case where the person who can be perceived from the plurality of cameras overlaps with another person when seen from a certain camera and the person rectangle cannot be estimated with high reliability, information of the camera is not used in the comparison. Whether or not there is an overlap between the tracking target persons can be determined by converting the positional information of the tracking target person into a position in the image using the camera parameter, estimating a region in which each tracking target person is present in the image, and determining whether or not the region overlaps with the region of another person.

<Example of Hardware Configuration>

For example, a hardware configuration of a computer that implements the information processing apparatus 2000 of Example Embodiment 4 is represented by FIG. 4 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

<Advantageous Effect>

According to the information processing apparatus 2000 of the present example embodiment, the update of the tracking information, the computation of the estimated body height, and the like are performed using the video frame 14 obtained from the plurality of cameras 10. Thus, the tracking of the person, the estimation of the body height, and the like can be performed with higher accuracy.

While example embodiments of the present invention have been described thus far with reference to the drawings, the example embodiments are illustrations of the present invention, and a configuration of combinations of the example embodiments or other various configurations can also be employed.

The invention claimed is:

1. An information processing system comprising:
a processor; and
memory storing executable instructions that, when executed by the processor, causes the processor to perform as:
a detection unit that detects a person from a video frame;
a state estimation unit that estimates a state of a target person using a result of the detection; and
a body height estimation unit that estimates a body height of the target person on the basis of a height of the target person in the video frame in a case where the state of the target person satisfies a predetermined condition,
wherein the body height estimation unit computes an estimated body height of the target person by computing a height of the target person in a real world from each of a plurality of video frames in which the estimated state satisfies the predetermined condition, and performing a statistic process on the plurality of computed heights,
wherein the state estimation unit
computes the height of the target person in the real world from each of a plurality of video frames in which the target person is included, and decides a threshold for determining whether or not the person is upright on the basis of the computed height, and
for the video frame that is subsequently generated, determines whether or not the target person is upright in the video frame by computing the height of the target person in the real world and comparing the height with the threshold,
wherein the predetermined condition is satisfied in a case where the target person is upright, or the predetermined condition is that the target person is in a predetermined pose, that likelihood of the target person being in the predetermined pose is greater than or equal to a threshold, or that foot of the target person is visible.

2. The information processing system according to claim 1,
wherein the state which the target person may take includes an upright movement state, an upright standstill state, and a non-upright standstill state, and
the predetermined condition is satisfied in a case where the state of the target person is the upright movement state or the upright standstill state.

3. The information processing system according to claim 1,
wherein the body height estimation unit performs the statistic process on the height of the target person in the real world computed from each of the plurality of video frames by applying a weight based on an angle of depression, which is determined by the target person and a direction of the camera generating the video frame and resolution of the target person in the video frame.

4. The information processing system according to claim 1,
wherein the state which the target person may take includes an upright movement state, an upright standstill state, and a non-upright standstill state, and
the state estimation unit further estimates at least one of a degree of openness of legs of the target person or a direction of the target person, and
in the statistic process, in a case where the state of the target person is the upright movement state, a higher weight is applied to the height of the target person in the real world as the degree of openness of the legs of the target person is decreased, or a higher weight is applied to the height of the target person in the real world as a degree to which the direction of the target person is different from a direction of the camera capturing the video frame is increased.

5. The information processing system according to claim 1,
wherein the state which the target person may take includes an upright movement state, an upright standstill state, and a non-upright standstill state, and
the body height estimation unit estimates the body height by performing weighting in consideration of the state of the target person, computes an approximate value of the body height using a time of the upright movement state as a reference, and estimates the body height by increasing a weight of an observation value that is stable at a value close to the approximate value of the body height before and after the upright movement state.

6. The information processing system according to claim 1, further comprising:
a temporary-height estimation unit that estimates a temporary-height of the target person on the basis of the height of the target person in the video frame.

7. The information processing system according to claim 6,
wherein the state which the target person may take includes an upright movement state, an upright standstill state, and a non-upright standstill state, and
even in a case where a foot position of the person is not seen, the temporary-height estimation unit computes an observation value of the temporary-height even from only a head part position in the upright standstill state and the non-upright standstill state by assuming that the foot position in the image does not move.

8. The information processing system according to claim 6,
wherein the detection unit generates a person detection result for each camera by performing a person detection process on each of the images generated by two or more cameras, and
for a tracking target person who is present in a region observable by a plurality of cameras, the temporary-height estimation unit and the body height estimation unit compare position coordinates that are included in a tracking result based on a detection result of the image that is acquired from each camera with a generation time difference less than a predetermined time, and correct observation values of the body height and the temporary-height such that a distance between the coordinates is decreased.

9. The information processing system according to claim 6,
wherein the temporary-height estimation unit and the body height estimation unit set the predetermined time to be short to an extent that the person can be regarded as being present at the same position when the person is in an upright movement state, and set the predetermined time to be long to an extent that the person can be regarded as being present at the same position and a change in pose can be regarded as not occurring in a case where the person is in an upright standstill state or a non-upright standstill state.

10. The information processing system according to claim 6,
wherein the detection unit detects the person from a first video frame generated at a first time point,
the information processing apparatus further comprises
an estimated position computation unit that estimates a position of each tracking target person at the first time point using tracking information that shows a history of information related to the tracking target person detected from the video frame generated before the first time point, and
an update unit that associates the person detected from the first video frame with the tracking target person by comparing a position of each person detected from the first video frame in a real world or the image with a position of each tracking target person in the real world or the image at the first time point, and updates the tracking information using a result of the association, and the update unit estimates the position of the person detected from the first video frame in the real world using the estimated body height of the person in a case where the person is upright, and estimates the position of the person detected from the first video frame in the real world using the temporary-height of the person in a case where the person is not upright.

11. A control method executed by a computer, the method comprising:
- detecting a person from a video frame;
- estimating a state of a target person using a result of the detection; and
- estimating a body height of the target person on the basis of a height of the target person in the video frame in a case where the state of the target person satisfies a predetermined condition,
- wherein the computer, in the estimating a body height of the target person, computes an estimated body height of the target person by computing a height of the target person in a real world from each of a plurality of video frames in which the estimated state satisfies the predetermined condition, and performing a statistic process on the plurality of computed heights,
- wherein the computer, in the estimating a state of a target person:
- computes the height of the target person in the real world from each of a plurality of video frames in which the target person is included, and decides a threshold for determining whether or not the person is upright on the basis of the computed height,
- for the video frame that is subsequently generated, determines whether or not the target person is upright in the video frame by computing the height of the target person in the real world and comparing the height with the threshold,
- wherein the predetermined condition is satisfied in a case where the target person is upright, or the predetermined condition is that the target person is in a predetermined pose, that likelihood of the target person being in the predetermined pose is greater than or equal to a threshold, or that foot of the target person is visible.

12. A non-transitory computer-readable storage medium storing a program causing a computer to execute the control method of claim 11.

* * * * *